(12) United States Patent
Friend

(10) Patent No.: US 12,164,472 B2
(45) Date of Patent: Dec. 10, 2024

(54) BACKUP SERVICE FOR A SOFTWARE PLATFORM

(71) Applicants: Atlassian Pty Ltd., Sydney (AU); Atlassian US, Inc., San Francisco, CA (US)

(72) Inventor: Richard Friend, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 26 days.

(21) Appl. No.: 18/090,924

(22) Filed: Dec. 29, 2022

(65) Prior Publication Data
US 2024/0220450 A1    Jul. 4, 2024

(51) Int. Cl.
*G06F 16/00* (2019.01)
*G06F 16/11* (2019.01)
(52) U.S. Cl.
CPC .................. *G06F 16/128* (2019.01)
(58) Field of Classification Search
CPC ..................................................... G06F 16/128
See application file for complete search history.

(56) References Cited

U.S. PATENT DOCUMENTS

| | | | |
|---|---|---|---|
| 2004/0220942 A1* | 11/2004 | Agrawal | G06F 16/284 |
| 2006/0195782 A1* | 8/2006 | Wang | G06F 16/9577 |
| | | | 715/205 |
| 2007/0011137 A1* | 1/2007 | Kodama | G06F 16/128 |
| 2007/0266062 A1* | 11/2007 | Young | G06F 16/113 |
| 2012/0310890 A1* | 12/2012 | Dodd | G06F 11/1451 |
| | | | 707/646 |
| 2019/0303838 A1* | 10/2019 | Chung | G06F 16/908 |

* cited by examiner

*Primary Examiner* — Syed H Hasan
(74) *Attorney, Agent, or Firm* — Brownstein Hyatt Farber Schreck, LLP

(57) ABSTRACT

Systems and methods for backing up data for a software platform include segmenting data objects from a software platform into data chunks, which are subsequently stored. Data chunks may include content from data objects having similar content attributes, such as content type and an estimated frequency at which the content changes. In various embodiments, pages from a content collaboration platform and issues from an issue tracking platform are grouped into chunks and stored for backup. A size of the chunks may be based on one or more content attributes associated with the pages or issues. Examples of content attributes include a relationship between text and non-text content, a number of associated users, and a number of comments.

20 Claims, 14 Drawing Sheets

BACKUP SERVICE FOR A SOFTWARE PLATFORM

TECHNICAL FIELD

Embodiments described herein relate to data backup, and in particular to the back up of data associated with a software platform such as a content collaboration platform and an issue tracking platform.

BACKGROUND

Modern teams may use networked computer systems in order to collaborate on projects and perform work from a variety of locations that are often remote from each other. In particular, software platforms may be used to develop and disseminate project information (e.g., a content collaboration platform) and/or track issues and tasks associated with a project (e.g., an issue tracking platform). The data associated with a software platform may thus be vital to the continuing development of a project. Accordingly, it may be desirable to periodically back up the data associated with a software platform. In particular, it may be desirable to back up the data associated with a software platform in such a way that the data can be restored from a particular point in time.

SUMMARY

Embodiments described herein relate to data backup, and in particular to the back up of data associated with a software platform such as a content collaboration platform and an issue tracking platform. In one embodiment, a method for backing up pages of a content collaboration platform, the pages including user-generated content created by one or more users of the content collaboration platform, includes, in response to a request for a backup of the pages: analyzing the user-generated content of at least a subset of the pages to determine one or more content attributes; defining a set of data chunks, each data chunk comprising a predetermined number of pages determined based at least in part on the one or more content attributes associated with each of the pages; and, for each data chunk: generating a unique identifier for the data chunk; storing the data chunk to be accessible via the unique identifier; and generating a record associating the unique identifier with information about a relationship of data in the data chunk to an application data structure of the content collaboration platform, and a backup date and time.

In one embodiment, the one or more content attributes comprise a relative measure of binary to non-binary data contained in the user-generated content. In one embodiment, the one or more content attributes comprise how often the user-generated content has been edited in the past. In one embodiment, the one or more content attributes comprise a number of users that have contributed to the user-generated content. In one embodiment, storing the data chunk to be accessible via the unique identifier comprises storing the data chunk using the unique identifier as a filename.

In one embodiment, the method further comprises, in response to a request for an updated backup of the pages: for each data chunk including content of a page that has changed since the backup: generating an updated data chunk including the content of the page that has changed since the backup; generating a unique identifier for the updated data chunk; storing the updated data chunk to be accessible via the unique identifier; and generating a record associating the unique identifier with information about a relationship of data in the data chunk to an application data structure of the content collaboration platform and an updated backup date and time.

In one embodiment, the method further comprises, in response to a request to restore the pages: selecting unique identifiers representative of data chunks based on a relationship between a desired date and time from which to restore the pages and the associated backup date and time of the unique identifiers; retrieving data chunks using the selected unique identifiers; and reconstructing the pages from the data chunks based on the associated relationship of data in each of the data chunks and the application data structure of the content collaboration platform.

In one embodiment, in response to a request for an updated backup, a unique identifier is generated for each data chunk and used to determine if content in the pages or issues has changed since the last backup. If a unique identifier has not been previously generated, a new backup is created based on an assumption that a change in the pages or issues has occurred. In another embodiment, the method further comprises, in response to a request for an updated backup of the pages: determining content of the pages that has changed since the backup; and, for each data chunk including content of a page that has changed since the backup: in response to determining a magnitude of change of the data chunk is above a predetermined threshold: generating an updated data chunk including the content of the page that has changed since the backup; generating a unique identifier for the updated data chunk; storing the updated data chunk to be accessible via the unique identifier; and generating a record associating the unique identifier with information about a relationship of data in the data chunk to an application data structure of the content collaboration platform and an updated backup date and time; and, in response to determining that the magnitude of change of the data chunk is below the predetermined threshold: generating a record describing changes to content of pages in the data chunk since the backup, the record being associated with the updated backup date and time.

In one embodiment, the method further comprises, in response to a request to restore the pages: selecting unique identifiers representative of data chunks based on a relationship between a desired date and time from which to restore the pages and the associated backup date and time of the unique identifiers; retrieving data chunks using the selected unique identifiers; for each record describing changes to content of pages of a data chunk having an associated backup date and time with a predetermined relationship to the desired date and time from which the restore the pages, applying the changes described in the record; and reconstructing the pages from the data chunks based on the associated relationship of data in each of the data chunks and the application data structure of the content collaboration platform. In one embodiment, at least one data chunk includes content from two or more pages.

In one embodiment, a method for backing up issues of an issue tracking platform, the issues including user-generated content created by one or more users of the issue tracking platform, comprises, in response to a request for a backup of the issues: analyzing at least a subset of the issues to determine one or more content attributes associated with the user-generated content of the issues; defining a set of data chunks, each data chunk comprising a predetermined number of issues, the predetermined number of issues being determined at least in part based on the one or more content attributes; and, for each data chunk: generating a unique identifier for the data chunk; storing the data chunk to be accessible via the unique identifier; and generating a record associating the unique identifier with information about a relationship of data in the data chunk to an application data structure of the issue tracking platform, and a backup date and time.

In one embodiment, the one or more content attributes comprise a number of assignees associated with the issues. In one embodiment, the one or more content attributes comprise a number of comments associated with the issues. In one embodiment, the one or more content attributes comprise a status of the issues. In one embodiment, storing the data chunk to be accessible via the unique identifier comprises storing the data chunk using the unique identifier as a filename.

In one embodiment, the method further comprises, in response to a request for an updated backup of the issues: for each data chunk including content of an issue that has changed since the backup: generating an updated data chunk including the content of the issue that has changed since the backup; generating a unique identifier for the updated data chunk; storing the updated data chunk to be accessible via the unique identifier; and generating a record associating the unique identifier with information about a relationship of data in the data chunk to an application data structure of the issue tracking platform and an updated backup date and time.

In one embodiment, the method further comprises, in response to a request to restore the issues: selecting unique identifiers representative of data chunks based on a relationship between a desired date and time from which to restore the issues and the associated backup date and time of the unique identifiers; retrieving data chunks using the selected unique identifiers; and reconstructing the issues from the data chunks based on the associated relationship of data in each of the data chunks and the application data structure of the issue tracking platform.

In one embodiment, the method further comprises, in response to a request for an updated backup of the issues: determining content of the issues that has changed since the backup; and, for each data chunk including content of an issue that has changed since the backup: in response to determining a magnitude of change of the data chunk is above a predetermined threshold: generating an updated data chunk including the content of the issue that has changed since the backup; generating a unique identifier for the updated data chunk; storing the updated data chunk to be accessible via the unique identifier; and generating a record associating the unique identifier with information about a relationship of data in the data chunk to an application data structure of the issue tracking platform and an updated backup date and time; and, in response to determining that the magnitude of change of the data chunk is below the predetermined threshold: generating a record describing changes to content of issues in the data chunk since the backup, the record being associated with the updated backup date and time.

In one embodiment, the method further comprises, in response to a request to restore the issues: selecting unique identifiers representative of data chunks based on a relationship between a desired date and time from which to restore the issues and the associated backup date and time of the unique identifiers; retrieving data chunks using the selected unique identifiers; for each record describing changes to content of issues of a data chunk having an associated backup date and time with a predetermined relationship to the desired date and time from which the restore the issues, applying the changes described in the record; and reconstructing the issues from the data chunks based on the associated relationship of data in each of the data chunks and the application data structure of the issue tracking platform. In one embodiment, at least one data chunk includes content from two or more issues.

In one embodiment, a method for backing up data objects of a software platform, includes, in response to a request for a backup of the data objects: analyzing each data object to determine an estimated stability of content of the data object; generating data chunks from the data objects based on the estimated stability of the content of each of the data objects, each data chunk including at least a portion of content of one of the data objects; and, for each data chunk: generating a unique identifier for the data chunk; storing the data chunk to be accessible via the unique identifier, and generating a record associating the unique identifier with information about a relationship of data in the data chunk to an application data structure of the software platform, and a backup date and time. In one embodiment, the one or more content attributes include one or more of a content type and an estimated content stability factor.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 3 depicts a graphical user interface showing a view of an issue tracking platform, such as described herein.

FIG. 4 depicts a graphical user interface showing a view of a backup service, such as described herein.

The use of the same or similar reference numerals in different figures indicates similar, related, or identical items.

Figure 1:
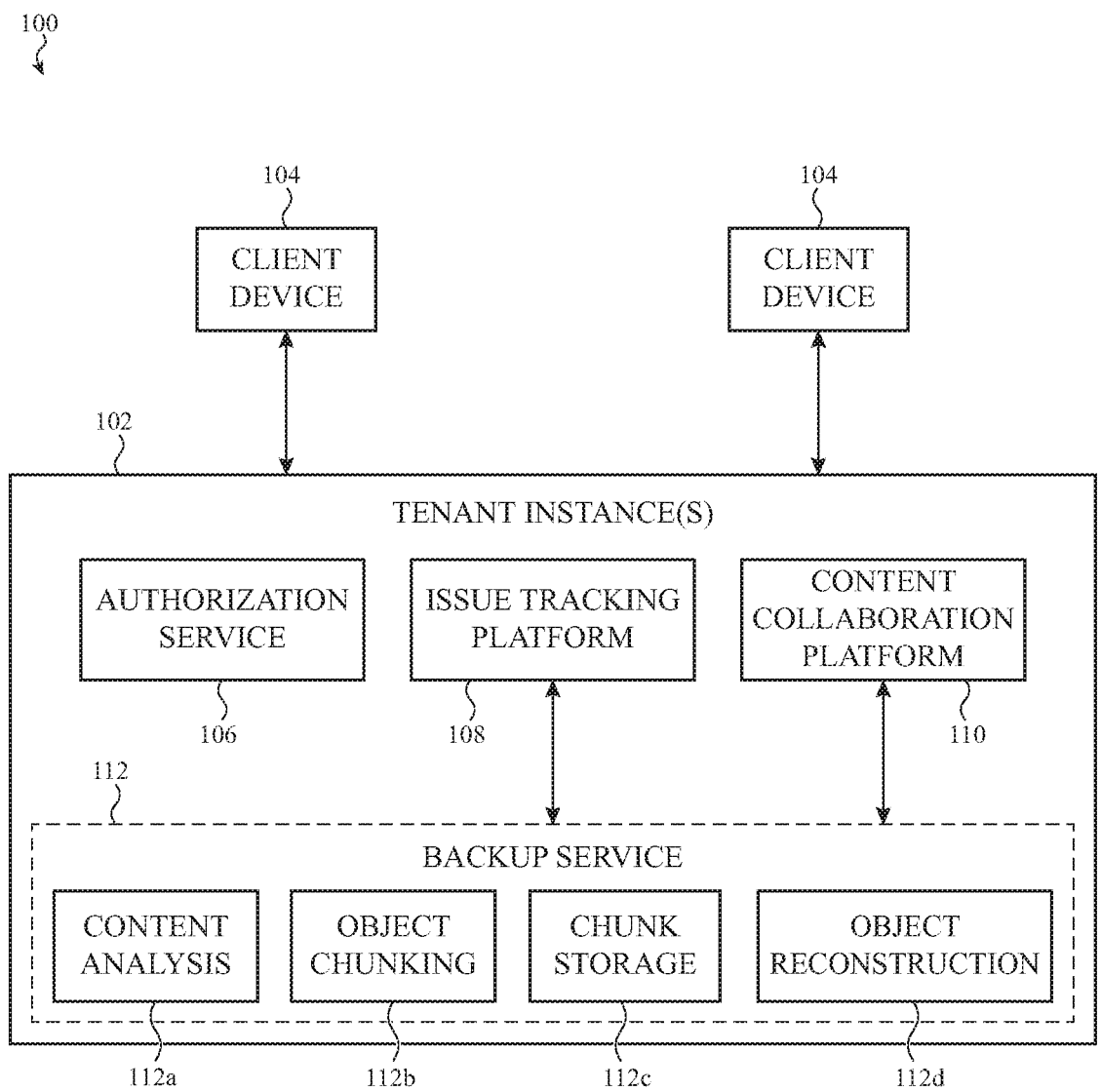
FIG. 1 depicts an architecture diagram of an application system, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Software platforms such as content collaboration platforms and issue tracking platforms may play a vital role in the continuing development of a project. In particular, the data contained within or otherwise associated with a software platform may be highly valuable to the ongoing development of the project. Accordingly, it may be desirable to periodically back up the data associated with a software platform. In particular, it may be desirable to back up the data associated with a software platform in such a way that the data can be restored from a particular point in time. Further, it may be desirable to back up the data in such a way that reduces or minimizes resources associated with generating backup data, maintaining backup data, storing backup data, and recreating application data from backup data.

Accordingly, the examples described herein relate to a backup service, which may be used to back up application data associated with a software platform such as a content collaboration platform and an issue tracking platform. The backup service may segment application data into chunks, which are subsequently stored as backup data. As used herein, the term "chunks" may be used to refer to blocks or sets of discrete data items that are treated as a monolith or unit for purposes of backup processes. For purposes of the following disclosure, the term chunk may also be interchangeable with terms like data block, backup data set, or simply backup block. As described herein, the discrete data items that comprise the chunk may be data files (e.g. documents, pages, or issues) or other data objects that are treated within the system as discrete content items. The discrete data items may also be a sub-file or sub-object item in which multiple discrete data items form a single file or data object.

As application data within a particular chunk changes, a new chunk may be generated and stored in the backup data. Chunks may include data or files that are located in a common document space, project, epic, or other system-defined file organization scheme. Chunks may also be grouped based on one or more shared or similar content attributes. A size of the chunks may be based on content of the application data, such that different content types and/or different content properties may result in different chunk sizes for storage. The size of the chunks may be determined based on a content stability factor or other prediction of a likelihood of the content to change over a certain time interval (which may correspond to a predicted backup interval). For example, application data that is frequently changed may be broken into smaller chunk sizes than application data that is infrequently changed. This may enable backup storage that tracks changes to application data over time with reduced resource overhead compared to prior solutions, as discussed in detail herein.

In one non-limiting example, a content collaboration platform may allow users to create content residing in electronic documents referred to herein as documents or pages. Pages may be located within a space (e.g., a document space or page space), such that a space provides a logical grouping of pages. Typically, a space is created by the author of the pages, who also has default administrator permissions with respect to pages and other content created within the space. Pages may contain content such as, for example, plaintext, rich text, links, comments, images, embedded content from other pages, and documents (e.g., PDFs, Microsoft Word documents, or the like). Accordingly, users may create spaces, pages, and page content to memorialize and share information, such as information relating to a particular project or institution. The spaces, pages, and page content may be stored in volatile or non-volatile memory in any number of ways, such as in discrete files having any format within a filesystem, as entries in a database, some combination thereof, or in any other suitable manner.

A backup service may backup the application data of the content collaboration platform including the spaces, pages, and page content by grouping pages together, the groups of pages forming chunks. The pages may be grouped such that a fixed number of pages exists in each chunk. A unique identifier may be generated for each chunk (e.g., by performing a hash function on the contents of the chunk), and the chunk may be stored such that it is accessible via the unique identifier (e.g., by storing the chunk in a filesystem using the unique identifier as the filename thereof). A manifest may be created to keep track of chunks, including when they were generated and how they can be assembled to generate all or a portion of the data associated with the content collaboration platform. For example, the manifest may keep track of which pages are located in a chunk, and which space each page belongs to. In some embodiments, the manifest may keep track of information such as how a given page or space is represented in memory of the content collaboration platform (e.g., a filename and/or database entry associated with a page or space). When the content of one or more pages within a chunk is changed by a user, a new chunk having a new unique identifier may be generated and stored. Changes in content of pages in chunks may be detected by hashing the group of pages and comparing the hash to a previous hash (as noted in a manifest). The new chunk may be noted in the same or an updated manifest. Accordingly, the backup system may store page content as it changes over time in chunks, and thus may provide a function to allow a user to restore pages from different points in time.

In some embodiments, the backup service may analyze pages to determine one or more content attributes of the pages. The one or more content attributes may be used to group pages together, the groups of pages forming chunks.

The one or more content attributes may additionally or alternatively determine a size of a given chunk (e.g., how many pages are included in a chunk). For example, pages with content that changes frequently may be grouped into smaller chunks than pages with content that rarely changes. In particular, a page that changes often may individually form a first chunk, while twenty pages that rarely change may be grouped together to form a second chunk.

As discussed above, a unique identifier may be generated for each chunk (e.g., by performing a hash function on the contents of the chunk), and the chunk may be stored such that it is accessible via the unique identifier (e.g., by storing the chunk in a filesystem using the unique identifier as the filename thereof). A manifest may be created to keep track of chunks, including when they were generated and how they can be assembled to generate all or a portion of the data associated with the content collaboration platform. For example, the manifest may keep track of which pages are located in a chunk, and which space each page belongs to. In some embodiments, the manifest may keep track of information such as how a given page or space is represented in memory of the content collaboration platform (e.g., a filename and/or database entry associated with a page or space). When the content of one or more pages within a chunk is changed by a user, a new chunk having a new unique identifier may be generated and stored. Changes in the content of pages in chunks may be detected by hashing the group of pages and comparing the hash to a previous hash (as noted in a manifest). The new chunk may be noted in the same or an updated manifest. Accordingly, the backup system may store page content as it changes over time in chunks, and thus may provide a function to allow a user to restore pages from different points in time.

To restore all or a portion of the data associated with the content collaboration service, the backup service may analyze the manifest or manifests to determine which chunks to reassemble and how they are arranged to reconstruct the application data. As discussed above, a user may provide the backup service with a date and time from which to restore the application data, which may be used along with the manifest or manifests to determine which chunks to reassemble into the application data.

Notably, while the foregoing example grouped entire pages into chunks for backup storage, the chunks may comprise any granularity of data in the software platform. For example, chunks may comprise groups of spaces, or groups of page content (e.g., a chunk may include only part of a page or pages). Further, chunks may comprise both complete and partial pages, as determined by a size of the chunk. For example, if a particular section of a page is changed very often in comparison to the rest of the page, the section of the page that is changed often may be segmented into a first chunk, with the remainder of the page content residing in a second chunk. In general, a backup service described herein may generate chunks of data from any arbitrary data structure or data object associated with a software platform, which may be with reference to how the data is organized within the application or how the data is organized in storage (e.g., non-volatile memory). Regardless of the data in each chunk, a backup service described herein may determine chunk sizes based on content within the chunks (e.g., based on a content type and/or a content stability factor describing how often the content changes), which may provide both space saving and data reconstruction performance advantages over conventional solutions.

A "stability factor" or a "content stability factor" can vary from embodiment to embodiment, but as used herein the phrase may correspond generally to a prediction of the rapidity with which a particular digital data item may change or may be updated. For example, how often text content may change in a document, how often file content may change in a folder on a disk, and so on. As may be appreciated, different contexts and different file types may be associated with different stability factors; stable data may be defined differently in different contexts. For example in some cases, "stable data" or data with a high stability factor may be predicted to remain unchanged for months or years on end, such as a person's name or a company name. In other cases, "stable data" may be defined as data predicted not to change for a period of weeks, months, years, or another time period. In some embodiments, binary data such as image data or multimedia data may be predicted to be stable by virtue of its filetype. In other cases, text data may be predicted to be less stable than binary data, especially if a text document has been recently edited. These foregoing examples are not exhaustive; a person of skill in the art will readily appreciate that different embodiments can define stability factors and formulas for defining the same in a number of ways.

Generally, there is a tradeoff between storage space required to maintain point in time backups of application data and the complexity of operations required to restore application data from backup data. For example, a fully differential backup system in which individual changes to data are each memorialized may require significantly less storage space than a backup system which images all data on each backup. However, reconstructing application data in a fully differential backup system may require a large number of operations, and thus may lead to restore times for application data that are unacceptable in certain scenarios. The backup system described herein may strike a balance between storage space required and the complexity of application data restoration for point in time backups by choosing appropriate chunk sizes, grouping data based on an analysis of the content thereof (e.g., based on how often the content changes), and varying chunk size (also based on the content of the data).

As another non-limiting example, an issue tracking platform may allow users to create issues associated with projects. The issues may describe tasks to be performed, and may include content such as, for example, plaintext, rich text, links, comments, images, and documents. The issues and projects may be stored in volatile or non-volatile memory in any number of ways, such as in discrete files having any format within a filesystem, as entries in a database, some combination thereof, or in any other suitable manner.

A backup service may back up the application data of the issue tracking platform including the projects, issues, and issue content by grouping issues together, the groups of issues forming chunks. The issues may be grouped such that a fixed number of issues exists in each chunk. The chunks may be assigned a unique identifier and stored as described above, such that as an issue or issues within a given chunk change, a new chunk is generated and stored. Once again, this may allow the backup system to store issue content as it changes over time, and thus may provide a function to allow a user to restore issues from different points in time.

The backup service may analyze issues to determine one or more content attributes of the issues. The one or more content attributes may be used to group issues that change at similar intervals together, the groups of issues forming chunks. The one or more content attributes may additionally or alternatively be used to determine a size of a given chunk (e.g., how many issues are included in a chunk). The chunks may be assigned a unique identifier and stored as described above, such that as an issue or issues within a given chunk change, a new chunk is generated and stored. Once again, this may allow the backup system to store issue content as it changes over time, and thus may provide a function to allow a user to restore issues from different points in time.

Notably, while the foregoing example grouped issues into chunks for backup storage, the chunks may comprise any granularity of data in the software platform. For example, chunks may comprise groups of projects, or groups of issue content (e.g., a chunk may include only part of an issue). Further, chunks may comprise both complete and partial issues, as determined by a size of the chunk.

A backup system and the methods for backing up data described herein can enable point in time backup of application data associated with a software platform in a way that saves storage space required for the backup and simplifies reconstruction of application data from backup data. While some of the specific examples are described with respect to pages, documents, or issues, the same or similar techniques may be used for a variety of different objects including, for example, other types of user-generated content, source code, compiled or binary software, build data, configuration data, text-based content, multimedia content, or other digital objects or content.

FIG. 1 shows a simplified architecture diagram of an application system 100. The application system 100 includes a number of tenant instances 102 and a number of client devices 104. The tenant instances 102 may be the same or different virtual or physical computing resources (referred to in many cases as a "cloud platform"). The tenant instances 102 may be communicably coupled to the client devices 104 over a local or wide area network (e.g., the Internet). The tenant instances 102 include one or more hardware resources such as, but not limited to (or requiring) one or more of: a processor allocation; a memory allocation (also referred to as working memory); non-volatile storage (also referred to as persistent memory); networking connections; and the like. The tenant instances 102 may instantiate one or more instances of an authorization service 106, an issue tracking platform 108, a content collaboration platform 110, and a backup service 112.

The authorization service 106 may provide identity verification and access management for users. That is, the authorization service 106 may verify the identity of users and manage access to various resources, such as the issue tracking platform 108 and the content collaboration platform 110, based on one or more access policies. The issue tracking platform 108 may provide issue tracking services for creating, managing, and tracking issues and tasks for projects and institutions, such as for software development, bug tracking, and/or information technology service management services. The content collaboration platform 110 may provide full-featured document editing and creation, allowing users to create and edit pages that are grouped into spaces, the pages and spaces containing, for example, information related to a project or institution.

The client devices 104 may access the issue tracking platform 108 and the content collaboration platform 110, for example, via a web browser. Accordingly, the issue tracking platform 108 and the content collaboration platform 110 may include a frontend component configured to render a user interface in a web browser. A user may thus interact with the issue tracking platform 108 via a web browser to create, update, and organize issues, among other features, and similarly interact with the content collaboration platform 110 via a web browser to create, update, and organize pages, among other features.

The issue tracking platform 108, the content collaboration platform 110, or any other software platform or service, may be configured to store one or more data objects in any form or format unique to that platform. Any data object may include one or more attributes and/or properties or individual data items that, in turn, include content inputted by a user and owned by an organization to which the user belongs. For example, the issue tracking platform 108 may store data objects for each issue, which may be, for example, files in a filesystem, entries in a database, or some combination thereof. As another example, the content collaboration platform 110 may store data objects for each page, which may be, for example, files in a filesystem, entries in a database, or some combination thereof. Both the issue tracking platform 108 and the content collaboration platform 110 may also store system logs, which note system events such as the creation, deletion, and modification of data objects and other user activity.

As discussed above, the data associated with a software platform may be vital to the continuing development of a given project or goal. Accordingly, it may be desirable to back up the data associated with a software platform. Accordingly, the backup service 112 is configured to back up data associated with one or more of the issue tracking platform 108 and the content collaboration platform 110. To do so, the backup service 112 includes a content analysis feature 112a, an object chunking feature 112b, a chunk storage feature 112c, and an object reconstruction feature 112d. The content analysis feature 112a may analyze data objects to determine a content type, content stability factor, or any other attributes of the content of a data object, which, as discussed in further detail herein, may be used to determine a chunk size for chunks of data stored by the data backup service 112. The object chunking feature 112b may chunk data objects, either by partitioning the data object into smaller data objects or combining the data objects with other data objects. The chunk storage feature 112c may manage the storage and retrieval of data chunks. The object reconstruction feature 112d may reconstruct data objects from chunks, either by reassembling chunks into data objects or breaking chunks into their constituent data objects.

Following the example described above, the backup service 112 may back up pages and spaces associated with the content collaboration platform 110. The content analysis feature 112a may analyze pages to determine one or more content attributes associated with content of each page. For example, the content analysis feature 112a may determine a content stability factor associated with each page or a sampling of pages, where the content stability factor indicates how often content of the page is changed by users of the content collaboration platform 110. In some cases, the size or number of elements (e.g., files) in a chunk may be based on the content stability factor such that chunks having elements that have or are predicted to have a low content stability factor may be smaller than chunks having elements that have or are predicted to have a high content stability factor. In some cases, elements with similar content stability factors may be grouped into chunks having a size determined by an average content stability factor of pages in the chunk and assigned a unique identifier by the object chunking feature 112b. The object chunking feature 112b may further generate or update a manifest noting a date and time the chunk was created, as well as information about the relationship of data in the chunk to other application data so that the application data can be reconstructed in part using the chunk. The chunk storage feature 112c may store the chunk so that it is accessible via the unique identifier. In some embodiments, the chunk storage feature 112c may segment chunks into different storage types or locations based on the one or more content attributes or any other information. For example, the chunk storage feature 112c may store some of the data chunks in "cold storage" and other data chunks in "hot storage", depending on an estimate of how often they will be accessed. Those skilled in the art will appreciate that segmenting storage in this manner may save cloud storage costs. The object reconstruction feature 112d may reconstruct one or more data objects (e.g., pages, groups of pages, spaces, or the like) from one or more chunks in the event that data restoration is required. Further details regarding the operation of the backup service 112 are discussed below.

The client devices 104 may interact with the backup service 112 in various embodiments in order to set an update schedule (e.g., hourly, daily, weekly), perform an on-demand backup, or restore application data of a software platform such as the issue tracking platform 108 and/or the content collaboration platform 110, either directly or indirectly.

A software platform as described herein may include a frontend and a backend configured to communicably couple over a computing network (which may include the Internet) to exchange computer-readable structured data. Many software platforms described herein may be architected as software-as-a-service (SaaS) platforms configured to operate over the Internet to render custom webpages within user browser windows, although it may be appreciated that this is merely one example construction and other embodiments can be implemented with native applications.

A frontend as described herein may be a first instance of software executing on a client device 104, such as a desktop computer, laptop computer, tablet computer, or handheld computer (e.g., mobile phone). The backend may be a second instance of software executing over a processor allocation and memory allocation or physical computer architecture, such as the tenant instances 102.

In many embodiments, the frontend and backend of a software platform herein are not collocated, and communicate over a large area or wide area network by leveraging one or more networking protocols, but this is not required of all implementations.

As noted above, a frontend software platform as described herein may be configured to render a graphical user interface at a client device 104 that instantiates frontend software. As a result of this architecture, the graphical user interface of the frontend can receive inputs from a user of the client device 104, which, in turn, can be formatted by the frontend into computer-readable structured data suitable for transmission to the backend for storage, transformation, and later retrieval.

One example architecture of the frontend includes a graphical user interface rendered in a browser executing on a client device 104. In other cases, a frontend may be a native application executing on the client device 104. Regardless of architecture, it may be appreciated that generally and broadly a frontend of a software platform as described herein is configured to render a graphical user interface to receive inputs from a user of the software platform and to provide outputs to the user of the software platform.

In FIG. 1, the term platform is generally used to denote software which includes both a frontend component and a backend component designed to be interacted with by users, while the term service is generally used to denote software which is primarily backend in nature and not designed for significant interaction from users. However, services may also include frontend components used for configuration and monitoring, and the terms may be used interchangeably.

As discussed above, a software platform may be defined by a frontend application instantiated by a client device 104 and a backend application instantiated by the tenant instances 102, whether virtual or physical. The backend application can be communicably coupled to the frontend application so as to receive inputs from and to provide information to a user of the frontend application. In addition, the backend application (and/or the frontend application) can be communicably coupled to a content store or shared data store, which may also be instantiated on the tenant instances 102, whether virtual or physical. In this construction, the backend application and/or the frontend application can submit requests to and receive inputs from each end in order to create and display content of the page or document for display in the graphical user interface of the frontend application. In some cases, backend applications can be configured to transmit to the frontend application an executable file or script, such as a JavaScript file or script, that, when executed by the frontend application, causes it to be rendered in the graphical user interface of the frontend, which can receive user input.

The backend application can be coupled to the frontend application (e.g., via WebSockets) in order to receive and parse user input to the document or page in real time or near real time. For example, as a user of the frontend begins providing text input, the partial text input can be transmitted back to the backend application for analysis and/or other processing (e.g., spell checking, grammar checking, slash command syntax checking, and so on). In some cases, the frontend application and the backend application can cooperate to analyze user input. For example, the frontend application may be configured to monitor for a particular user input, after which the frontend application can communicate with the backend application to provide the corresponding functionality.

Figure 2:
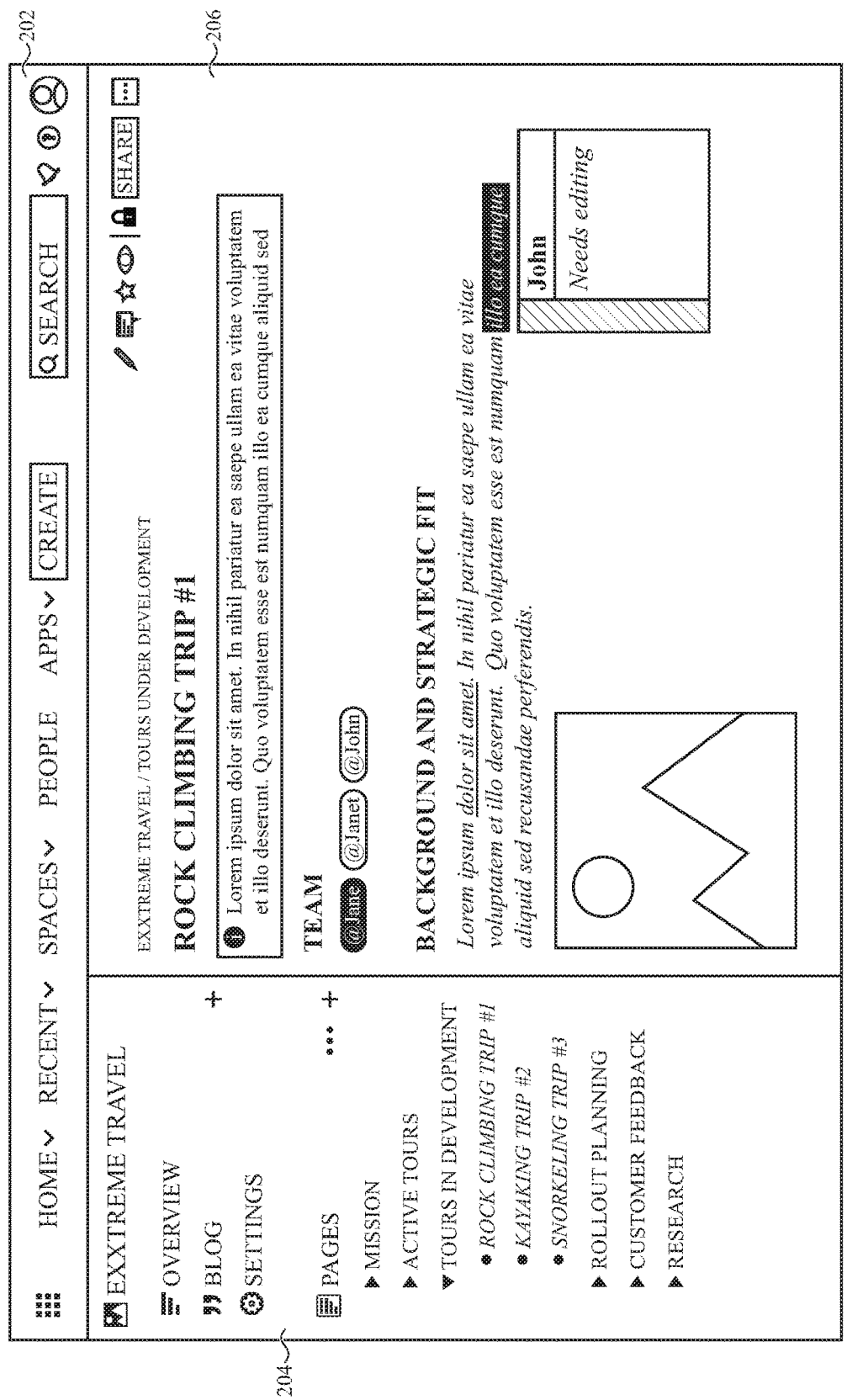
FIG. 2 depicts a graphical user interface showing a view of a content collaboration platform, such as described herein.

FIG. 2 shows an example view of a graphical user interface 200 of a content collaboration platform, such as the content collaboration platform 110 discussed with respect to FIG. 1. The graphical user interface 200 may be presented as part of a frontend application, and may be rendered, for example, in a web browser. The graphical user interface 200 includes a header 202, a sidebar 204, and a main interface panel 206. As discussed above, a content collaboration platform may include a number of document spaces or page spaces, each of which includes a number of pages. The pages may include page content, which can include plaintext, rich text, links, embedded content, documents, and the like. The header 202 may allow a user to navigate between parts of the application (e.g., via drop-down menus), such as to a given space, to information associated with a person (e.g., a user), to see one or more recently created or edited pages, or to other parts of the application. The sidebar 204 may show information related to a given space, such as, for example, a title of the space and one or more pages associated with the space. As shown, pages may be displayed in an expandable tree view based on a hierarchical relationship between pages, page groups (e.g., logical groups of pages) and the space, which resides at the top of the tree. The sidebar 204 may thus allow for navigation of pages and other views related to a currently viewed space. The main interface panel 206 may display a page and allow a user to view and edit the page. As shown, a page may include text including a title, links, both internal (e.g., to other pages, spaces, people, or the like) and external (e.g., to external web pages), formatted text such as tooltips or the like, embedded content (e.g., content from a different page or from an external web page), comments, or any other content, including non-text (e.g., images, binary data) content. Further, a page may include associated data not necessarily shown such as a number of associated integrations (relationships with other application platforms or services), metadata, or the like. The main interface panel 206 may allow for both viewing and editing of the page content (if a user has permission to do so). In general, FIG. 2 illustrates a graphical user interface for a content collaboration platform, which enables a user to navigate through spaces and pages in order to view, add, and edit content in a collaborative manner.

One or more content attributes of a page may provide useful information for the backup thereof, such as an estimate of how often the content of the page will change (e.g., an estimated content stability factor). For example, a relationship between the amount of text content and non-text content (e.g., binary to non-binary data) of a page may be indicative of how often the page will change. For example, a page with a significant number of binary data elements (e.g., images, multimedia elements) may indicate a lower likelihood of frequently changing than a page that is mostly text content. In other cases, or for other organizations or in other contexts, binary data may be associated with higher frequency changes than non-binary data; a person of skill in the art may appreciate that implementations vary.

In accordance with the examples described herein, a content stability factor may be computed or determined based on an analysis of an amount of binary data or elements as compared to an amount of non-binary data or elements for a given page, document, or other data object. For example in some circumstances, a higher amount of text content with respect to non-text content may indicate that a page is more likely to change (as there is more editable content). Other attributes or properties of the page or data object may also be used to compute or determine a content stability factor. As another example, a frequency at which a page or other object has been edited in the past (determined, for example, with reference to one or more system logs or metadata associated with the page) may be indicative of how often the page will change. In particular, a higher number of past edits may indicate that a page is more likely to change in the future, or a direction of change of past edit frequency may be correlated with a future likelihood to change. As another example, a number of users associated with a page, such as a number of users that have edited the page, may be indicative of how often a page will change. In particular, a higher number of editing users may indicate that a page is more likely to change. In some cases, a number of users associated with a document/page space or other object collection may be used to compute the content stability factor. As another example, a number of links, either to other content or from other content, in a page may be indicative of how often a page will change. In particular, a higher number of links from other content (links to the page) may indicate that a page is more likely to change. As another example, a number of comments on a page may be indicative of how often the page will change. In particular, a higher number of comments may indicate that a page is more likely to change. Notably, the foregoing are only examples of content attributes that provide useful information for the backup thereof, and the present disclosure contemplates the use of any other attributes and relationships between attributes to determine the same.

Figure 3:
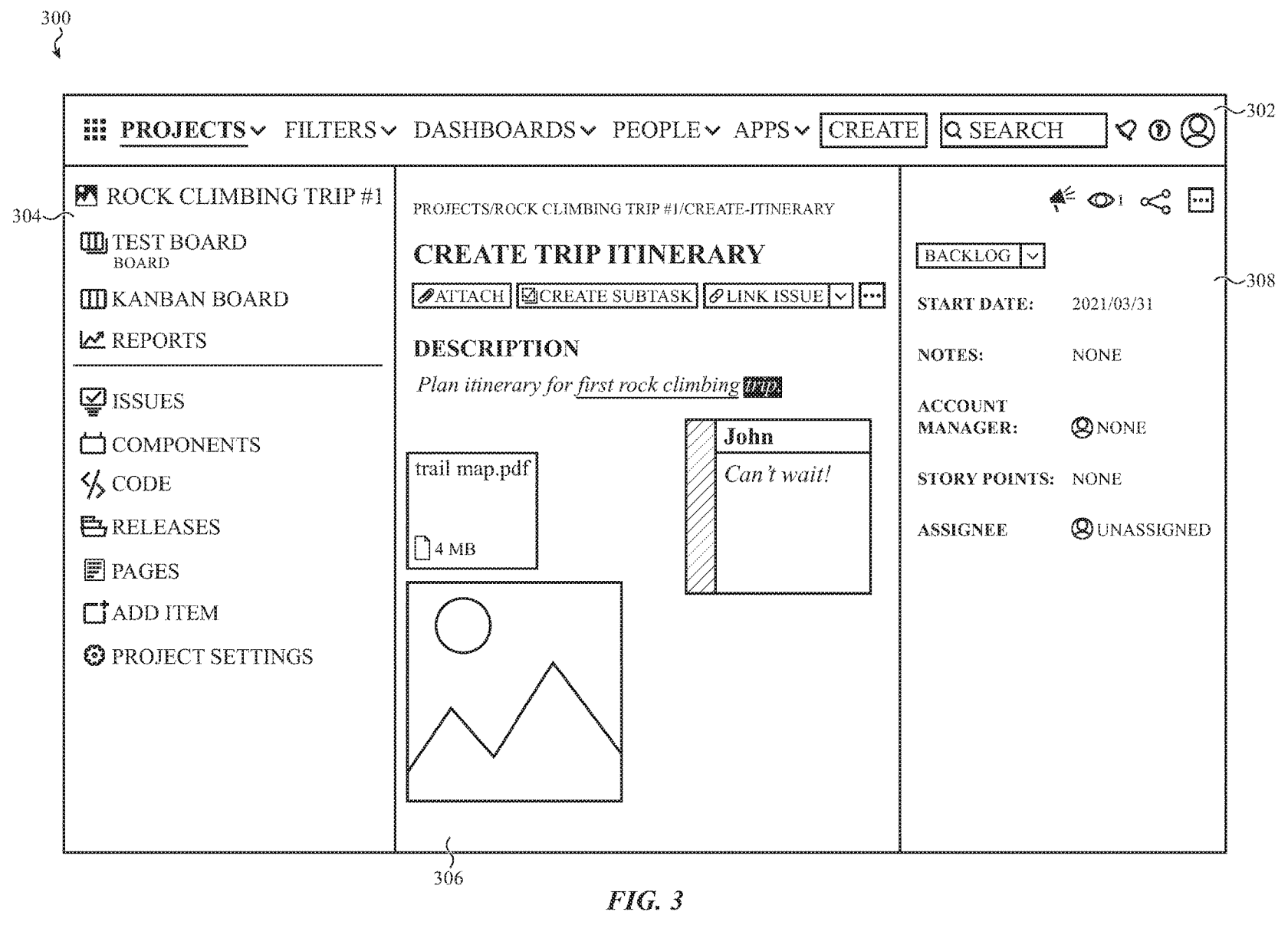

FIG. 3 shows an example view of a graphical user interface 300 of an issue tracking platform, such as the issue tracking platform 108 discussed with respect to FIG. 1. The graphical user interface 300 may be presented as part of a frontend application, and may be rendered, for example, in a web browser. The graphical user interface 300 includes a header 302, a sidebar 304, a main interface panel 306, and a details panel 308. The header 302 may allow a user to navigate between parts of the application (e.g., via drop-down menus), such as to a given project, to information associated with a person (e.g., a user), to one or more dashboards including a collection of issues, or to other parts of the application. The sidebar 304 may show information related to a given project, such as, for example, a title of the project, issues associated with the project, and allow for navigation to various views of information associated with the project. The main interface panel 306 may show details about a particular issue that has been selected. As shown, an issue may include a title, description, and one or more attachments (e.g., file attachments). An issue may also include links, embedded content, non-text content (e.g., images, binary data), comments, and other information. Further, an issue may include associated data not necessarily shown such as a number of associated integrations (relationships with other application platforms or services), metadata, or the like. The details panel 308 shows details about the currently viewed issue, such as a start date, assignee, and the like. In general, FIG. 3 illustrates a graphical user interface for an issue tracking platform, which enables a user to navigate through projects and issues in order to view, add, and edit projects and issues to keep track of progress over time.

One or more content attributes of an issue may provide useful information for the backup thereof, such as an estimate of how often the content of the issue will change (e.g., an estimated content stability factor). For example, a relationship between the amount of text content and non-text content (e.g., binary data to non-binary data) of an issue may be indicative of how often the issue will change. In particular, a higher amount of text content with respect to non-text content may indicate that the issue is more likely to change. As another example, a frequency at which an issue (or issue type) has been edited in the past (determined, for example, with reference to one or more system logs or metadata associated with the issue) may be indicative of how often the issue will change. In particular, a higher number of past edits may indicate that a page is more likely to change in the future, or a direction of change of past edit frequency may be correlated with a future likelihood to change. As another example, a number of users associated with an issue, such as a number of users that the issue is assigned to and/or a number of users that have edited the issue, may be indicative of how often the issue will change. In particular, a higher number of assignees and/or editing users may indicate that an issue is more likely to change. As another example, a status of an issue may be indicative of how often the issue will change. In particular, closed issues may be much less likely to change than open issues. In some cases, a project, epic, or story to which the issue is assigned is used to determine a content stability factor. A project, epic, or story that is currently under development having a significant number of open issues may indicate that issues associated with the project, epic, or story are more likely to change and will, thus, have a lower content stability factor. Notably, the foregoing are only examples of content attributes that provide useful information for the backup thereof, and the present disclosure contemplates the use of any other attributes and relationships between attributes to determine the same.

Figure 4:
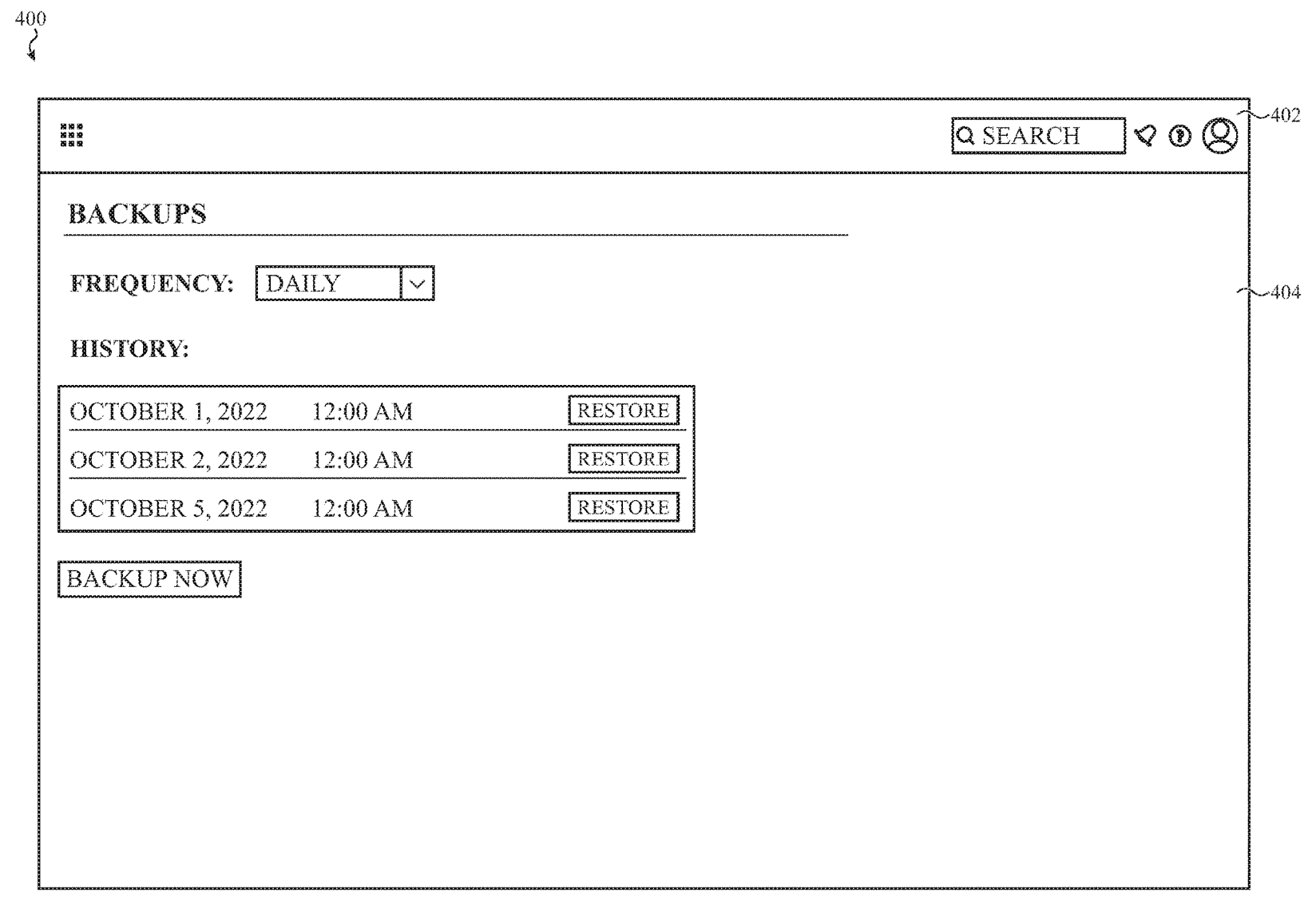

FIG. 4 shows an example view of a graphical user interface 400 including settings of a backup service, such as the backup service 112 discussed with respect to FIG. 1. The graphical user interface 400 may be presented as part of a frontend application, and may be rendered, for example, in a web browser. In some embodiments, the graphical user interface 400 may form part of a frontend application associated with a software platform, such as a content collaboration platform or an issue tracking platform. For example, the graphical user interface 400 may be presented in a settings portion of a frontend application of a software platform. The graphical user interface 400 includes a header 402 and a main interface panel 404. The main interface panel 404 may include a number of controls allowing an authorized user to select an update frequency (e.g., hourly, daily weekly), view existing backups, restore a software platform from a given existing backup (e.g., from a point in time at which a given backup was taken), or initiate a backup. The system may receive a request to initiate a backup or restore a backup from a graphical user interface similar to the graphical user interface 400 of FIG. 4.

Notably, the graphical user interfaces shown in FIGS. 2-4 are merely illustrative and are meant to give the reader a general sense of the types of information within and the capabilities of the software platforms and services described herein. To recap, a content collaboration platform may represent data in the form of spaces and pages, for example, although many other types of data may be present, and an issue tracking platform may represent data in the form of projects and issues, although many other types of data may also be present. In any software platform, the way data as organized by the application may be different from the way the data is organized for storage (e.g., in non-volatile memory). For example, pages in a content collaboration platform may be stored as individual files in a filesystem, as an entry in a database, or some combination thereof, or may be stored across multiple files, multiple entries in a database, or some combination thereof. Similarly, issues in an issue tracking platform may be stored as individual files in a filesystem, as an entry in a database, or some combination thereof, or may be stored across multiple files, multiple entries in a database, or some combination thereof.

A backup service as described herein may chunk and store application data based on how the data is organized in the software platform (e.g., based on pages in a content collaboration platform or issues in an issue tracking platform), or based on how the data is organized in storage (e.g., based on files in a filesystem or entries in a database). Accordingly, the following discussion references the backup of "data objects," which, as discussed to herein, refers to any data or data structure. As such, a data object could be a page in a content collaboration platform, a part of a page in a content collaboration platform, a collection of pages in a content collaboration platform, an issue in an issue tracking system, a part of an issue in an issue tracking system, a collection of issues in an issue tracking system, a file in a filesystem, a part of a file in a filesystem, a collection of files in a filesystem, an entry in a database, a part of an entry in a database, multiple entries in a database, or any other data.

Figure 5:
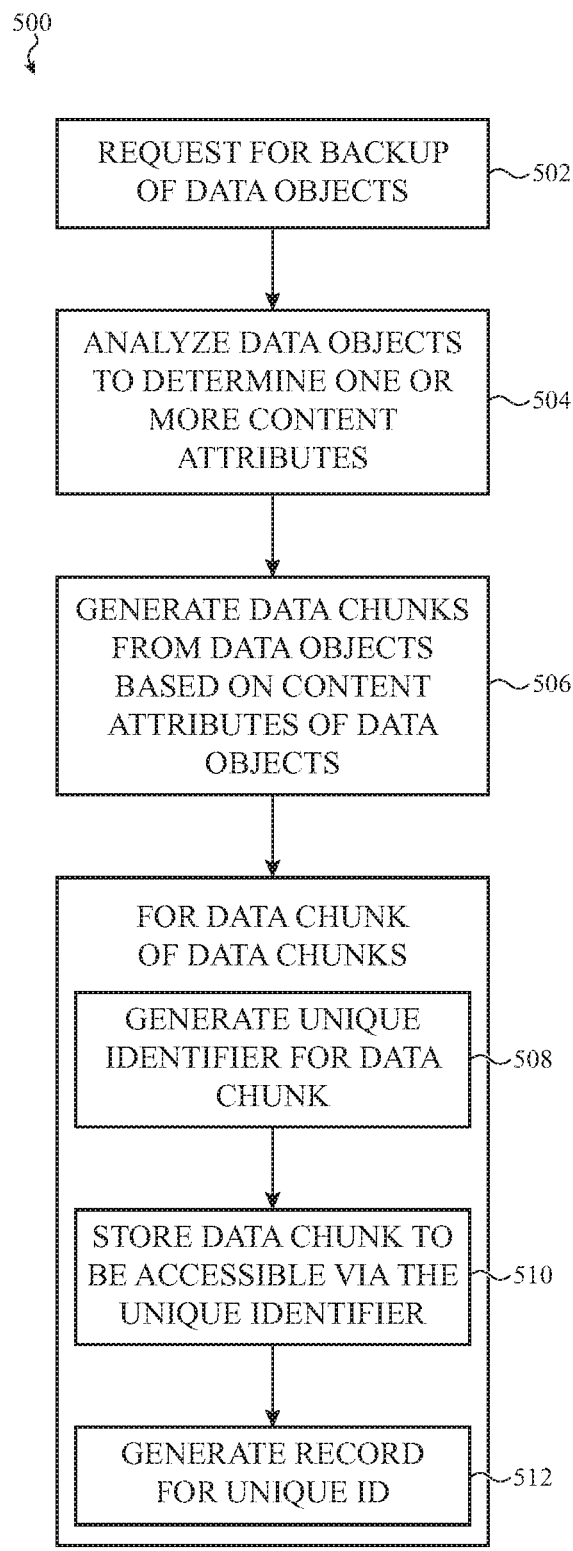
FIG. 5 depicts a block diagram illustrating a method for backing up data objects from a software platform, such as described herein.

FIG. 5 shows a block diagram 500 of an example method for creating a backup of data objects of a software platform. The method starts in block 502, where a request for a backup of data objects is received. The request for the backup of the data objects may be received at a backup service, for example, from the software platform, from a client device, or from any other source, over a local or wide area network such as the Internet. In some embodiments, the request for the backup of the data objects is generated internally within the backup service (e.g., as a scheduled task). In response to the request for the backup of the data objects, the data objects may be analyzed to determine one or more content attributes associated with each data object in block 504. In some embodiments, one or more content attributes may be determined for the entirety of a data object. In other embodiments, one or more content attributes may be determined for individual parts of the content of a data object. For example, a first section, link, document, or other collection of content within a data object may be associated with one or more content attributes that are different from those of another section, link, document, or other collection of content within the data object. The one or more content attributes may include a content type indicating a type of content in the data object, an estimated content stability factor indicating an estimation of the frequency that content in the data object changes over time, or any other attributes. In block 506, data chunks are generated from the data objects based on the associated content attributes of the data blocks. This could include grouping data objects together to form a data chunk or segmenting a data object to form several data chunks. The size of the data chunks (e.g., number of data objects or elements) may be determined based on an analysis of a sampling of the content of the data objects or elements. As discussed previously, the content or attributes may be analyzed to determine a content stability factor or other estimated prediction regarding the stability of the data to be assigned to a data chunk.

Each of the data chunks may include at least a portion of content of one of the data objects, but may also include a complete data object, multiple data objects, or some combination thereof. As described previously, data objects or portions of data objects having similar content attributes are grouped together to form the data chunks. Further, a size of each data chunk may also be dependent on the content attributes for data objects or portions of data objects in the data chunk. For example, data chunks including content associated with a content stability factor indicating the content is changed often may be smaller (e.g., include less content) than data chunks including content associated with a content stability factor indicating the content is rarely changed. In some embodiments, a size of a data chunk may be specified with reference to a number of data objects contained therein (e.g., a data chunk may include two data objects). In other embodiments, a size of data chunks may be specified with reference to some measurement of content therein, such as a number of entities, a number of key-value pairs, a number of lines of text, or the like. In still other embodiments, a size of data chunks may be based on a size of the data chunk on disk, such as a fixed number of bytes.

For each data chunk of the data chunks, a unique identifier may be generated for the data chunk in block 508, the data chunk may be stored to be accessible via the unique identifier in block 510, and a record may be generated for the unique identifier in block 512. Generating the unique identifier may be based on content of the data chunk, such as by performing a hash function on the data chunk (e.g., MD5, SHA-1, or the like). Storing the data chunk to be accessible via the unique identifier may include storing the data chunk as a file in a filesystem using the unique identifier as the filename, for example. The record for the unique identifier may include information about a relationship of the data in the data chunk to an application data structure of the software platform. For example, the record may indicate how to reassemble the data in the data chunk into one or more of the data objects. The record may also be associated the unique identifier with a backup date and time, which is the date and time that the backup was performed.

Figure 6:
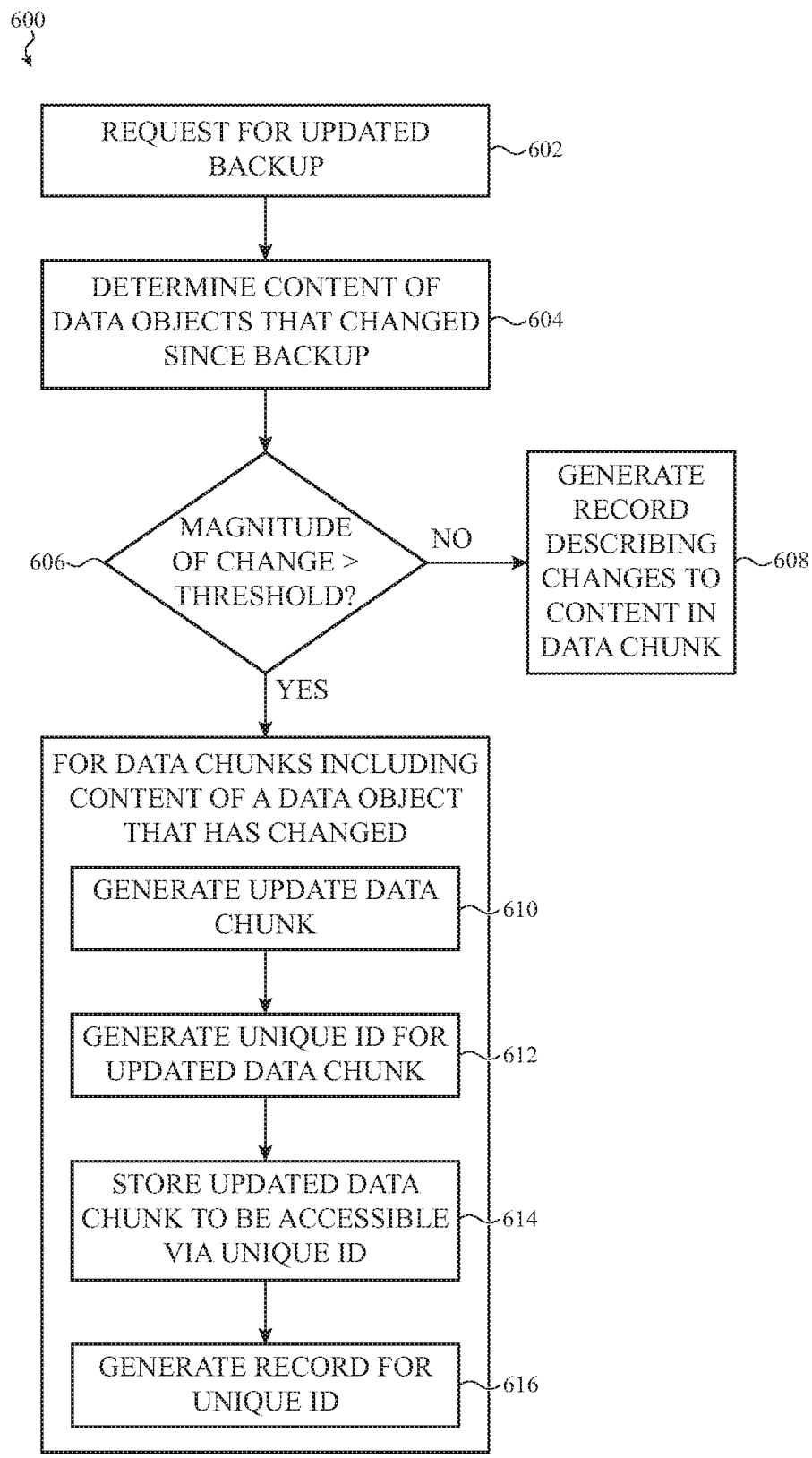
FIG. 6 depicts a block diagram illustrating a method for backing up data objects from a software platform, such as described herein.

FIG. 6 shows a block diagram 600 of an example method for generating an updated backup of the data objects of the software platform. The method starts in block 602, where a request for an updated backup of the data objects is received. The request for the updated backup of the data objects may be received at a backup service, for example, from the software platform, from a client device, or from any other source, over a local or wide area network such as the Internet. In some embodiments, the request for the updated backup of the data objects is generated internally within the backup service (e.g., as a scheduled task). In response to the request for the updated backup of the data objects, content of the data objects that has changed since the latest backup may be determined in block 604. Determining content of the data objects that has changed since the latest backup may be accomplished in any suitable manner, such as a comparison of data objects from the latest backup, parsing of logs, or the like. In some embodiments, determining content of the data objects that has changed since the latest backup is accomplished by hashing the data objects or sub-components thereof, such that blocks 604 and 612 are combined. In block 606, an optional determination is made regarding whether a magnitude of change of content within a given data chunk is above a predetermined threshold. In some embodiments, if the magnitude of change of content in a given data chunk is below the predetermined threshold, a record may be generated describing changes to the content in the data chunk in block 608. This may be instead of generating an updated block as described below, and may allow for a reduction in the space consumed by backup data at the expense of increased complexity when restoring application data from backup data. In some embodiments, blocks 606 and 608 may be omitted such that the method proceeds directly from block 604 to block 610.

In block 610, an updated data chunk is generated, which includes the content that changed since the latest backup, as well as the other content in the data chunk which did not change since the latest backup. In block 612, a unique identifier for the updated data chunk is generated (e.g., by a hash function as described above). In block 614, the updated data chunk is stored to be accessible via the unique identifier. In block 616, a record is generated for the unique identifier, which, as discussed above, may include information about a relationship of data in the data chunk to an application data structure of the software platform, as well as the date and time the updated backup was performed.

To recap, in an initial backup, data chunks may be generated that together include all of the content of the data objects for which backup is desired. In subsequent updated backups, only data chunks that include content that has changed since the last backup are generated and stored. Notably, previous versions of data chunks remain stored, such that changes to the data objects over time are memorialized and the data objects can be restored to their state at different points in time. Using data chunks rather than performing a complete backup image at each point in time saves significant space required for backup data. Further, using data chunks rather than memorializing each individual change to the data (e.g., in the case of a full differential backup solution), and, in some embodiments, using a combination of data chunks and individual memorialization of smaller changes to the data, results in reduced complexity of data restoration from backup data.

Figure 7:
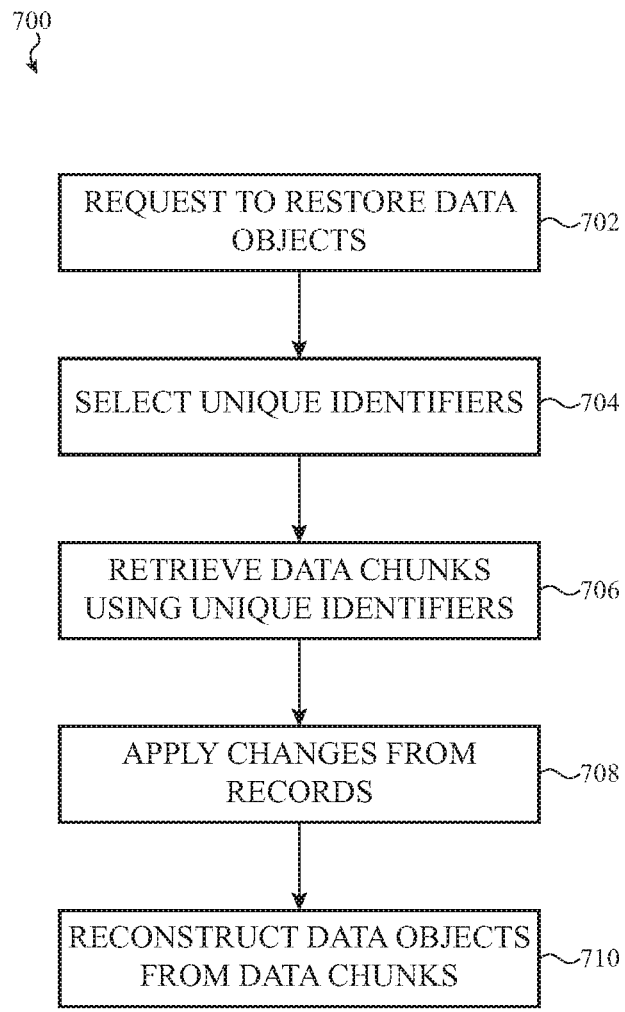
FIG. 7 depicts a block diagram illustrating a method for restoring data objects from a software platform from backup data, such as described herein.

FIG. 7 shows a block diagram 700 of an example method for restoring data objects of a software platform from backed up data chunks. The method starts in block 702, where a request to restore data objects of the software platform is received. The request to restore the data objects may be received at a backup service, for example, from the software platform, from a client device, or from any other source, over a local or wide area network such as the Internet. In response to the request to restore the data objects, unique identifiers representing backed up data chunks may be selected in block 704. The unique identifiers may be selected from a plurality of unique identifiers based on, for example, restoration parameters included as part of the request to restore the data objects. For example, the restoration parameters may include a date and time from which to restore the data objects. As another example, the restoration parameters may indicate only certain data objects to restore. Accordingly, the unique identifiers may represent the data chunks including the content necessary to restore the data objects to a desired state (e.g., as indicated by the restoration parameters). In some embodiments, this may include comparing a desired date and time for restoration of the data objects to a backup date and time associated with each unique identifier. In block 706, data chunks are retrieved using the selected unique identifiers. In block 708, changes from records describing changes to data chunks (as discussed above with respect to blocks 606 and 608 of FIG. 6) that have a predefined relationship with the restoration parameters (e.g., are before the requested date and time of restoration) are applied to the data chunks. In block 710, the data chunks are reconstructed from the data chunks. Reconstructing the data objects from the data chunks may include referencing the information about the relationship of the data in each data chunk the application data structure of the software platform.

Figure 8A:
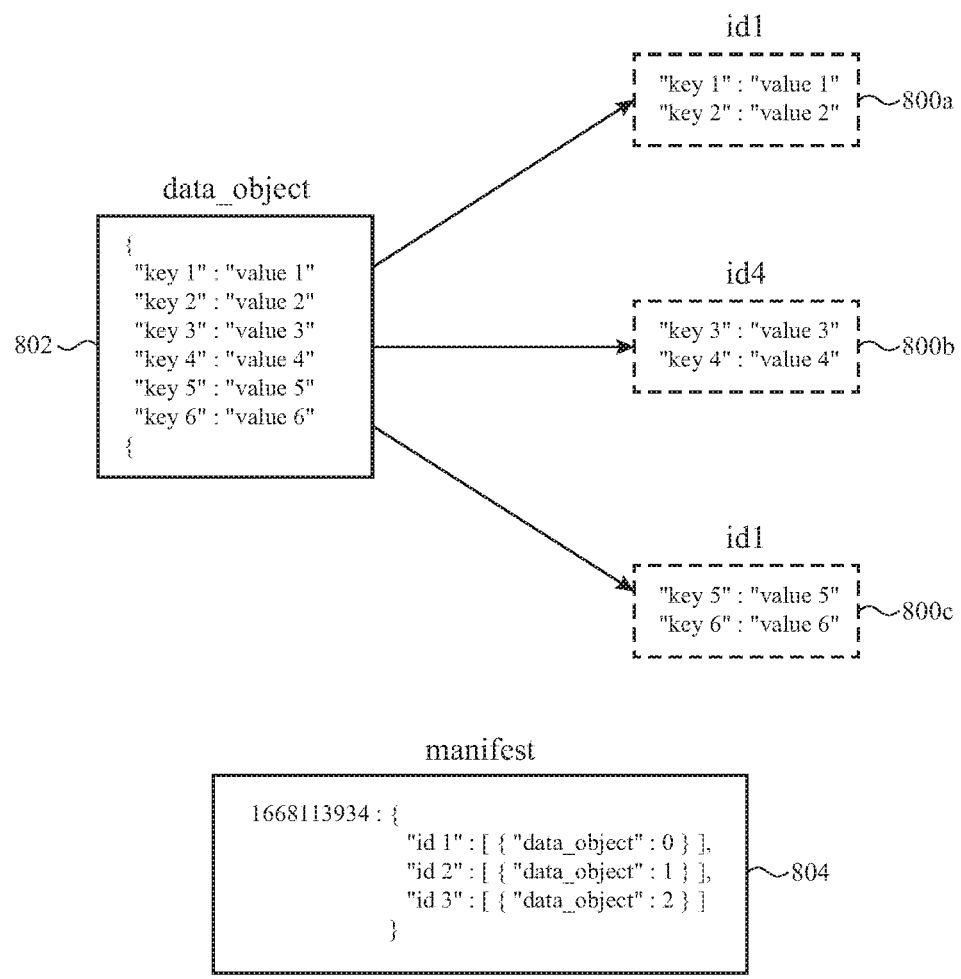
FIGS. 8A through 8C depict illustrative examples of segmenting a data object into data chunks for backup, such as described herein.
Figure 8B:
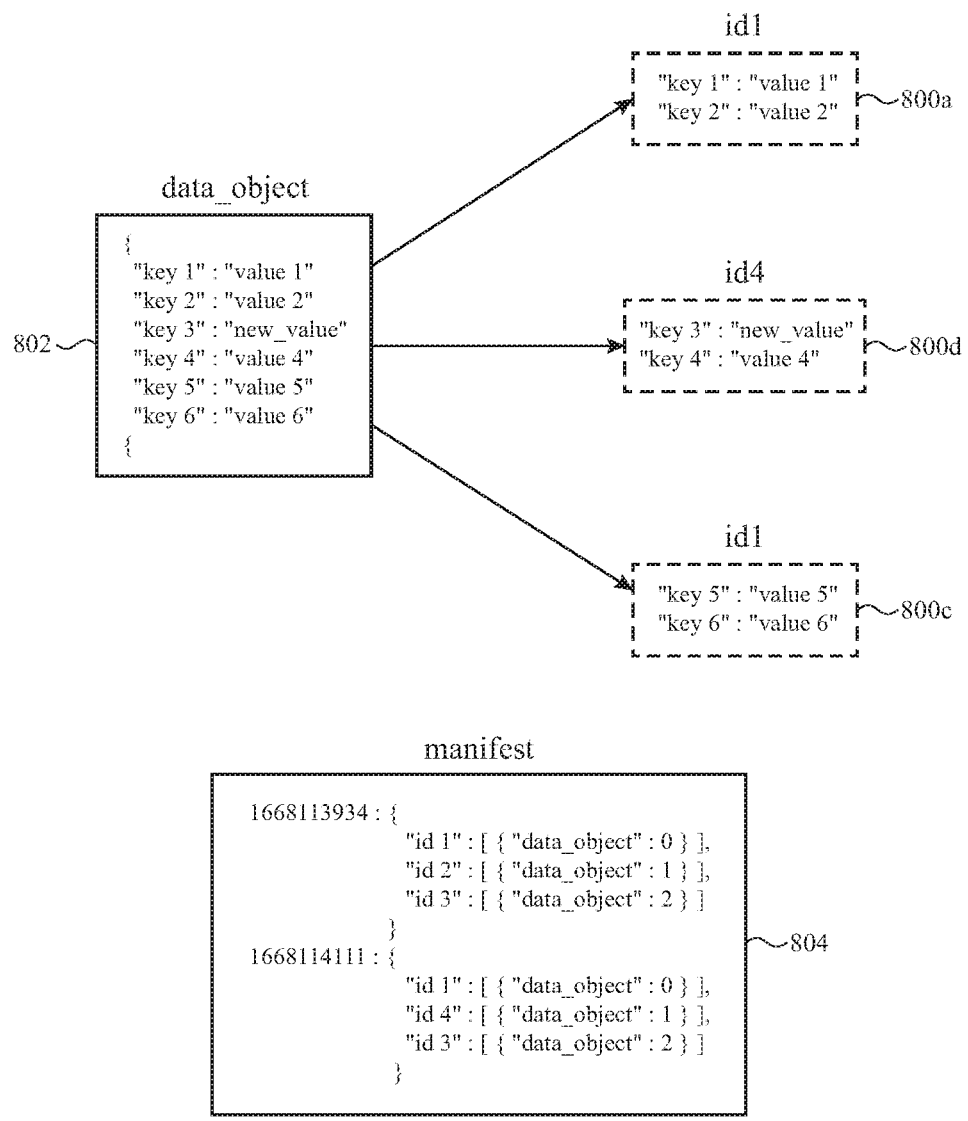
Figure 8C:
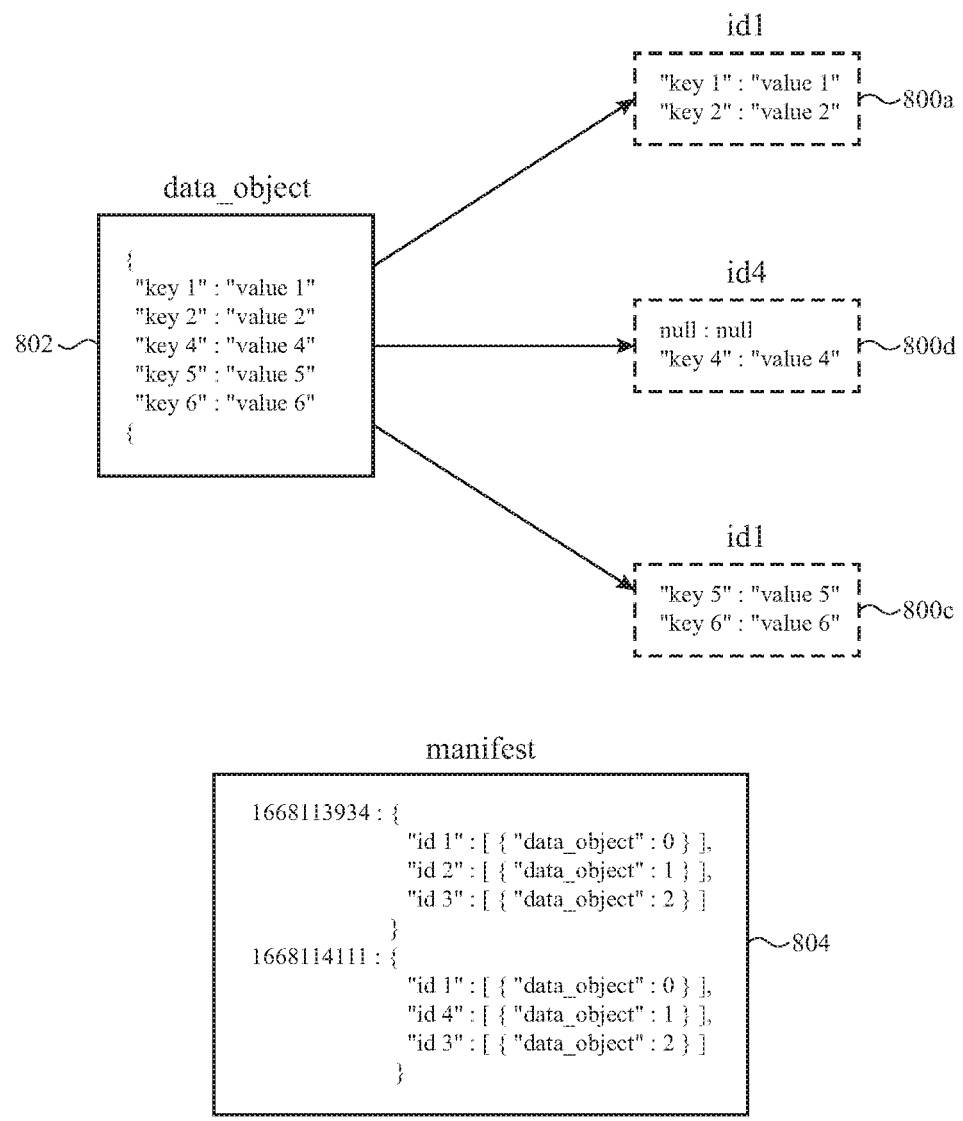

FIGS. 8A through 8C illustrate high-level examples of a data chunk or data chunks being generated from a data object or data objects. In particular, FIG. 8A shows three data chunks 800 (individually 800a, 800b, and 800c), each associated with a unique identifier (id1 through id3), being generated from an exemplary a data object 802. For purposes of example only, the data object 802 includes JavaScript Object Notation (JSON) content. Notably, the principles of the present disclosure apply equally to any type of data objects including any type of content. As shown, each data chunk 800 includes a number of key-value pairs from the data object. As discussed above, the size of each of the data chunks 800 may be chosen based on one or more content attributes associated with the data object 802. An example manifest 804 is also shown, which notes a timestamp at which the data chunks 800 were generated as a key, the unique identifiers for each data chunk 800 as subkeys, and information identifying the data object 802 to which the data in each data chunk 800 belongs, as well as a location of the data in the data chunk 800 within the data object 802 as values for each unique identifier. Notably, the format of the manifest 804 and information therein is merely exemplary and is meant to give the reader a general idea of how data chunks could be mapped to data objects for restoration of the data objects at a later time.

FIG. 8B shows an updated data chunk 800d being generated in response to updated content of the data object 802 being updated (in the present example, the value of "key3" is changed), and the resulting updated entry in the manifest

804. As shown, the updated data chunk 800*d* having a new unique identifier is generated, and the manifest 804 is updated to note the new arrangement of data chunks 800 representing the state of the data object 802 at a later date and time (keyed by the later timestamp) from the original backup. Notably, the previous data chunk (800*b*) remains stored, and, by referencing the manifest 804, the data object can be restored in either its original state or the updated state. Once again, the format of the manifest 804 and information therein is merely exemplary and is meant to give the reader a general idea of how data chunks could be mapped to data objects for restoration of the data objects at a later time.

In some cases, content may be added to or removed from a data object. In these scenarios, it may be desirable to limit the number of data chunks affected by a given change to avoid generating and storing new data chunks unnecessarily. Accordingly, FIG. 8C shows a scenario in which a key-value pair is eliminated from the data object 802 ("key3" is removed in the present example). In order to limit the impact of the change to a single data chunk 800, a null placeholder may be provided for the deleted content in the data object 802, as shown in an updated data chunk 802*d*. This may prevent cascading effects causing changes to several data chunks 800 that would occur if the data chunks 800 maintained the same number of key-value pairs from the data object 802. In the present example, the null placeholder isolates changes to the updated data chunk 800*d*, which is noted in a similar way in the manifest 804 as in FIG. 8B.

Figure 9:
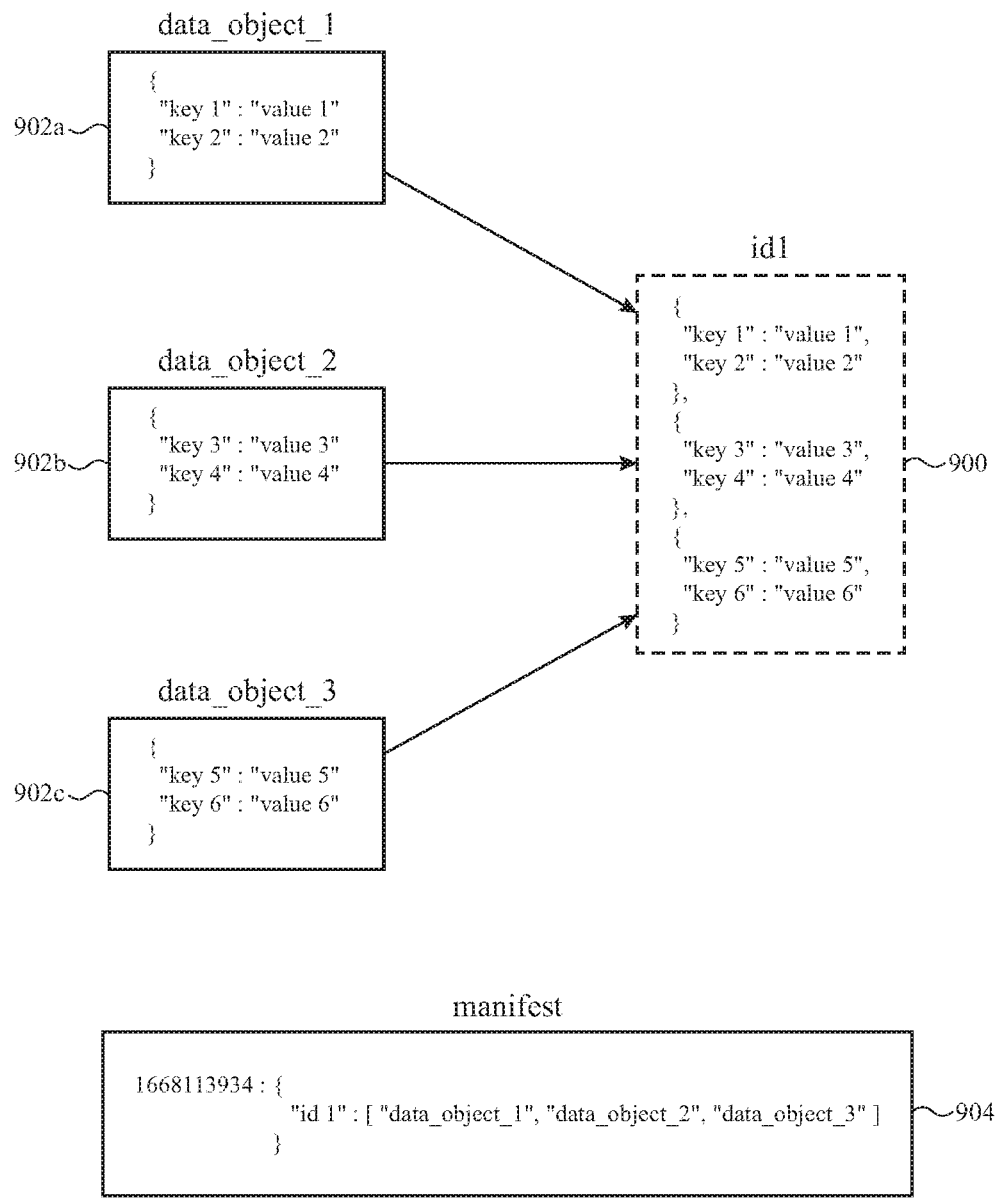
FIG. 9 depicts an illustrative example of combining data from data objects into a data chunk for backup, such as described herein.

While the foregoing examples in FIGS. 8A through 8C showed a data object being partitioned into several data chunks, the opposite scenario may also occur wherein multiple data objects are combined into a single data chunk. This may be dependent on the size of data chunks for a particular data object or data objects, which, as discussed above, may be selected based on one or more content attributes associated therewith. Accordingly, FIG. 9 illustrates a single data chunk 900 being generated from a number of data objects 902. As shown, content from the data objects 902 is combined to form the data chunk 900, which is noted in a manifest 904 in a similar way to that discussed above.

Figure 10A:
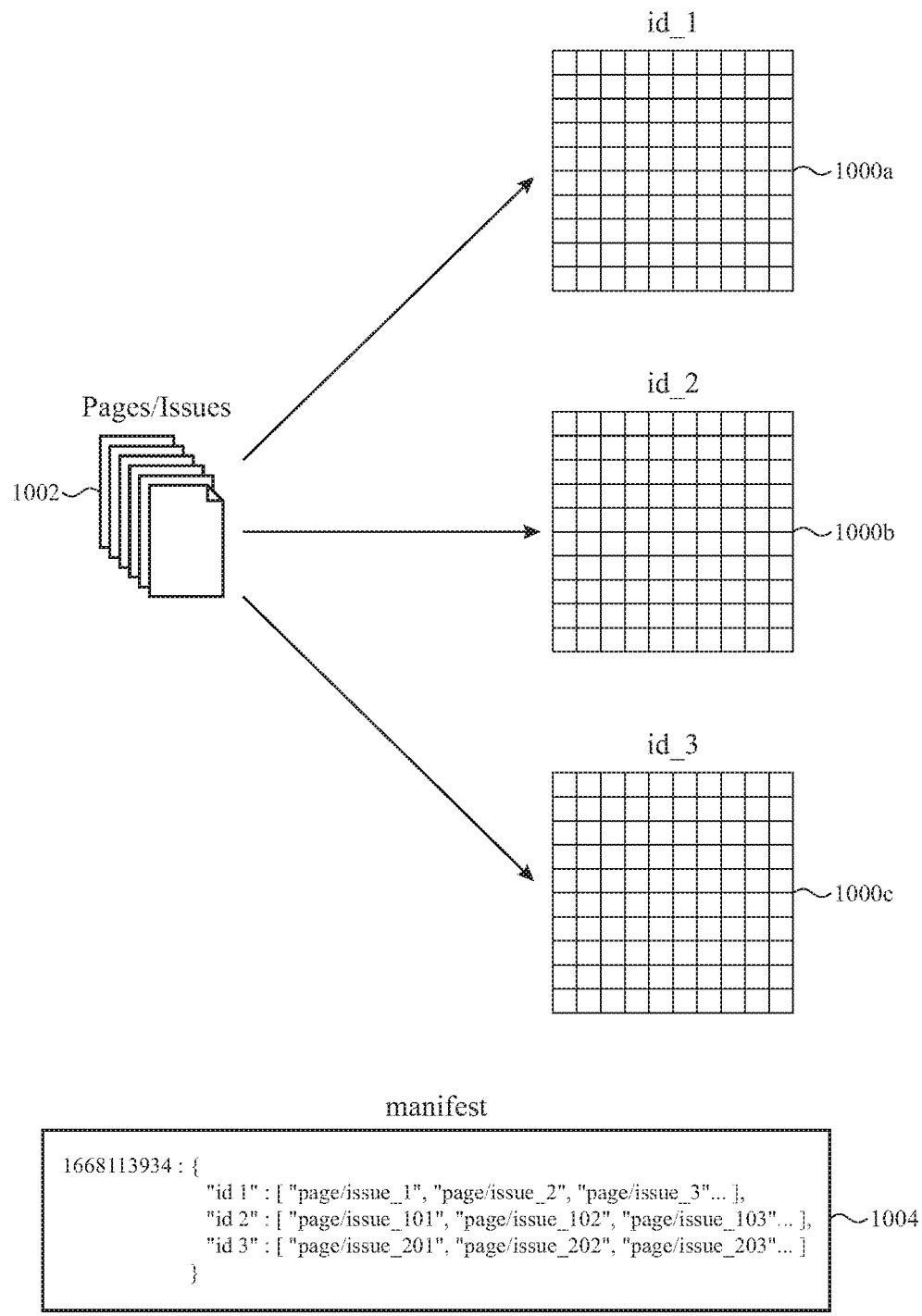
FIGS. 10A and 10B depict illustrative examples of combining pages or issues into data chunks for backup, such as described herein.

FIG. 10A illustrates an embodiment wherein a number of data chunks 1000 (individually 1000*a*. 1000*b*, 1000*c*) are generated from a number of pages/issues 1002, where the pages are representative of pages in a content collaboration platform and the issues are representative of issues in an issue tracking platform. As discussed herein, the pages/issues 1002 may be data structures or a collection of data structures representing the content of the page/issue. These data structure(s) may be any type of data structure(s) without departing from the principles herein, but generally represent the entirety of the content of a given page or issue. As shown, a number of data chunks 1000 are generated, each having a predetermined number of pages/issues 1002 (100 in the current example). A manifest notes the unique identifier associated with each data chunk 1000 and the pages/issues 1002 included in the chunk, similar to that discussed above.

As discussed above, the predetermined number of pages/issues 1002 in each of the data chunks 1000 may be determined based on one or more content attributes of all or a subset of the pages/issues 1002 in each of the data chunks 1000. In some embodiments, a subset of pages/issues 1002 are sampled to determine one or more content attributes thereof, such as an estimated content stability factor, and a size of a data chunk 1000 including the sampled pages/issues 1002 and, in some embodiments, one or more pages/issues 1002 related to the sampled pages/issues 1002 is determined based on the one or more content attributes of the subset. Related pages/issues 1002 may be, for example, pages that are in the same space, issues that are in the same project, and/or pages/issues that are linked to one another. Since pages/issues 1002 that are in the same space/project or otherwise related to one another may tend to have similar content attributes (e.g., may include content that tends to change at similar rates), sub-sampling in this manner may reduce resource consumption associated with the backup process while providing performant chunk sizes. Sampling a subset of pages/issues 1002 to determine chunk sizes may include sampling a random subset of all of the pages/issues 1002 and determining a size of the chunk based on the content attributes based on the assumption that similarly organized pages/issues will share content attributes that signal or serve as a proxy for content stability. Alternatively, the process may include grouping together pages/issues having similar content attributes, and subsequently chunking the pages/issues 1002 into the data chunks 1000. In other embodiments, pages/issues 1002 that are related to one another in some manner as discussed above may be grouped, each group of related pages/issues 1002 may be sub-sampled, and groups of related pages/issues 1002 having similar content attributes may be grouped together into data chunks 1000. In still other embodiments, a subset of all of the pages/issues 1002 are sampled to determine a chunk size for all of the data chunks 1000, such that all of the data chunks 1000 have the same size (the same number of pages/issues 1002).

Figure 10B:
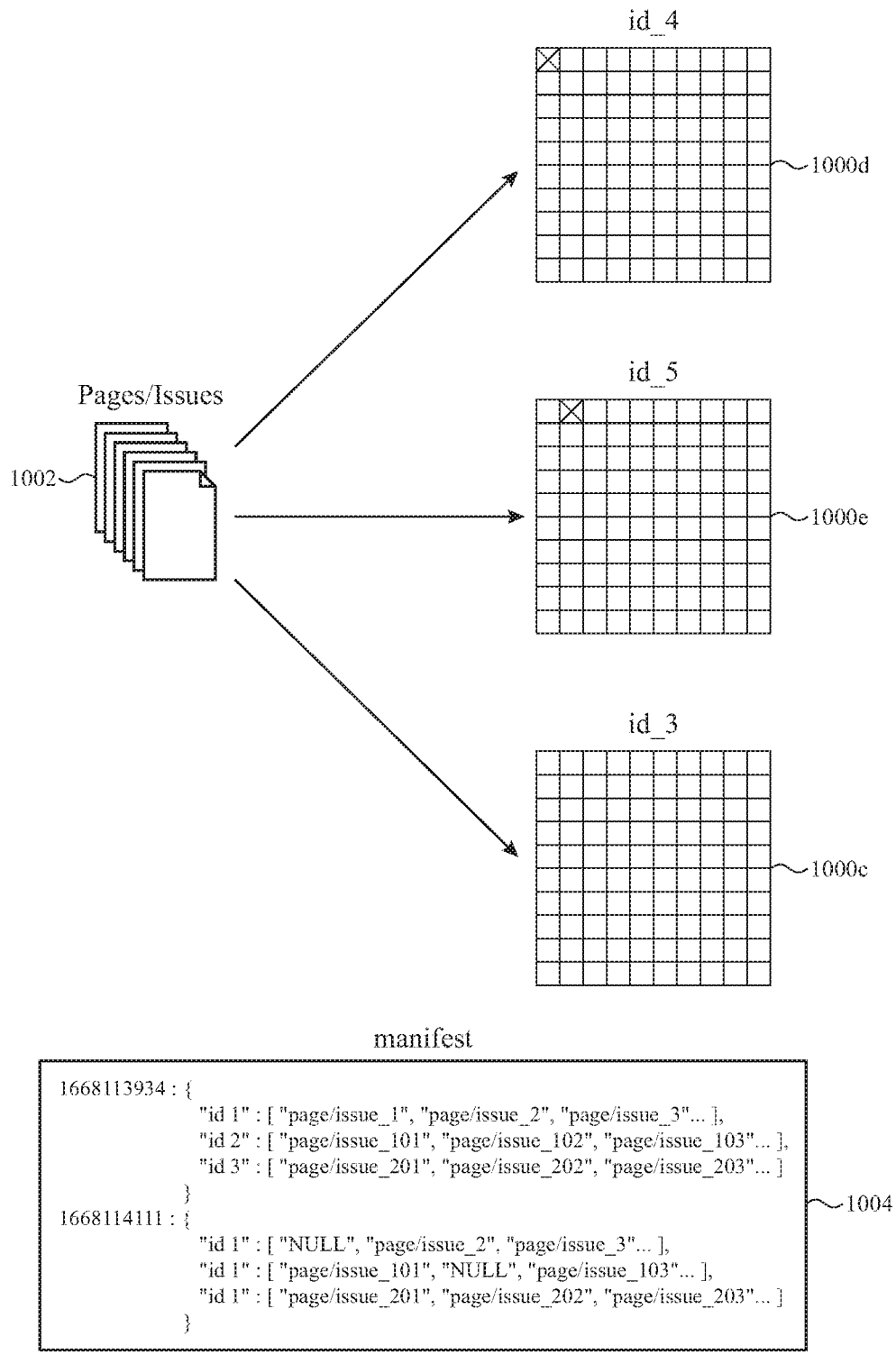

FIG. 10B illustrates what happens when one or more of the pages/issues 1002 are deleted from their respective content collaboration platform or issue tracking platform. In particular, as represented by an X in the respective data chunks, a first page/issue 1002 is deleted from a first data chunk 1000*a* and a second page/issue 1002 is deleted from a second data chunk 1000*b* as shown in FIG. 10A. Instead of shifting all of the pages/issues 1002 included in each data chunk 1000 so that each data chunk 1000 includes the same number of issues, a null placeholder may be provided in the first data chunk 1000*a* to form a fourth data chunk 1000*d* and a null placeholder may be provided in the second data chunk 1000*b* to form a fifth data chunk 1000*c*, as shown in FIG. 10B. These null placeholders may be noted in the manifest as shown. As discussed above, this may prevent changes to a single page/issue 1002 from cascading between data chunks 1002 and thus requiring the storage of additional data chunks.

Figure 11:
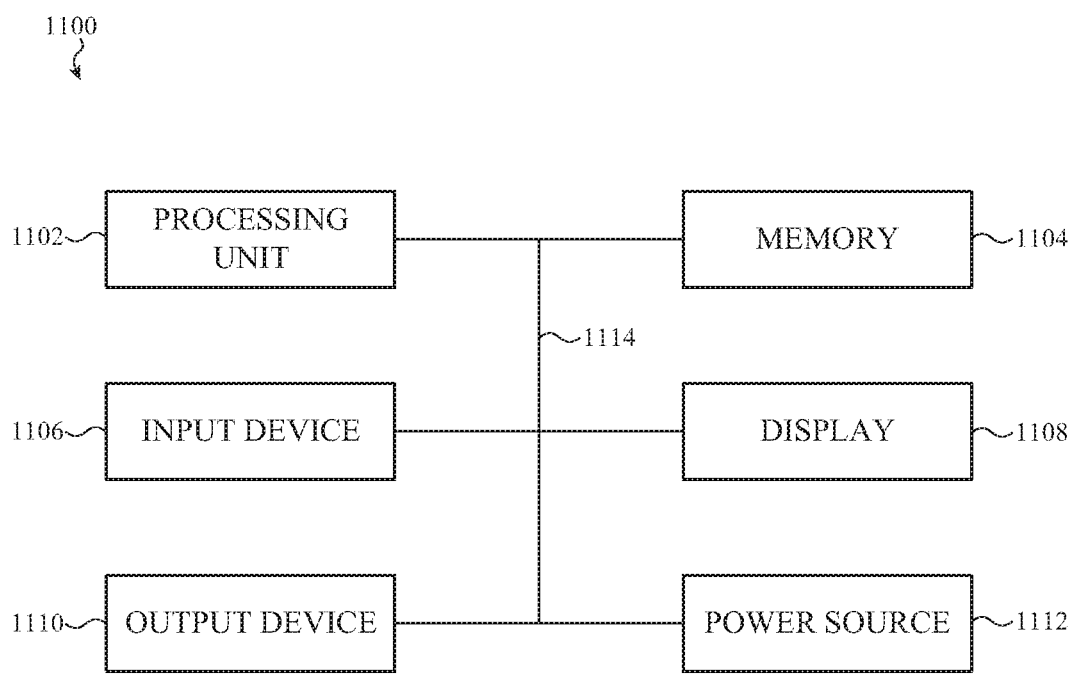
FIG. 11 depicts a block diagram of an electronic device, such as described herein.

FIG. 11 depicts example electrical hardware of an electronic device 1100 that may implement the application system 100 or any portion thereof, such as one or more of the tenant instances 102, one or more of the client devices 104, the authorization service 106, the issue tracking platform 108, the content collaboration platform 110, and the backup service 112. The electronic device 1100 can include one or more of a processing unit 1102, a memory 1104, or storage device, input devices 1106, a display 1108, output devices 1110, and a power source 1112. In some cases, various implementations of the electronic device 1100 may lack some or all of these components and/or include additional or alternative components.

The processing unit 1102 can control some or all of the operations of the electronic device 1100. The processing unit 1102 can communicate, either directly or indirectly, with some or all of the components of the electronic device 1100. For example, a system bus or other communication mechanism 1114 can provide communication between the processing unit 1102, the power source 1112, the memory 1104, the input device(s) 1006, and the output device(s) 1010.

The processing unit 1102 can be implemented as any electronic device capable of processing, receiving, or transmitting data or instructions. For example, the processing unit 1102 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1100 can be controlled by multiple processing units. For example, select components of the electronic device 1100 (e.g., an input device 1106) may be controlled by a first processing unit and other components of the electronic device 1100 (e.g., the display 1108) may be controlled by a second processing unit, where the first and second processing units may or may not be in communication with each other The power source 1112 can be implemented with any device capable of providing energy to the electronic device 1100. For example, the power source 1112 may be one or more batteries or rechargeable batteries. Additionally or alternatively, the power source 1112 can be a power connector or power cord that connects the electronic device 1100 to another power source, such as a wall outlet.

The memory 1104 can store electronic data that can be used by the electronic device 1100. For example, the memory 1104 can store electronic data or content such as, for example, audio and video files, documents and applications, device settings and user preferences, timing signals, control signals, and data structures or databases. The memory 1104 can be configured as any type of memory. By way of example only, the memory 1104 can be implemented as random access memory, read-only memory, Flash memory, removable memory, other types of storage elements, or combinations of such devices.

In various embodiments, the display 1108 provides a graphical output, for example associated with an operating system, user interface, and/or applications of the electronic device 1100 (e.g., a chat user interface, an issue tracking user interface, an issue-discovery user interface, etc.). In one embodiment, the display 1108 includes one or more sensors and is configured as a touch-sensitive (e.g., single-touch, multi-touch) and/or force-sensitive display to receive inputs from a user. For example, the display 1108 may be integrated with a touch sensor (e.g., a capacitive touch sensor) and/or a force sensor to provide a touch- and/or force-sensitive display. The display 1108 is operably coupled to the processing unit 1102 of the electronic device 1100.

The display 1108 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1108 is positioned beneath and viewable through a cover that forms at least a portion of an enclosure of the electronic device 1100.

In various embodiments, the input devices 1106 may include any suitable components for detecting inputs. Examples of input devices 1106 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, control elements, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1106 may be configured to detect one or more particular types of input and provide a signal (e.g., an input signal) corresponding to the detected input. The signal may be provided, for example, to the processing unit 1102.

As discussed above, in some cases, the input device(s) 1106 include a touch sensor (e.g., a capacitive touch sensor) integrated with the display 1108 to provide a touch-sensitive display. Similarly, in some cases, the input device(s) 1106 include a force sensor (e.g., a capacitive force sensor) integrated with the display 1108 to provide a force-sensitive display.

The output devices 1110 may include any suitable components for providing outputs. Examples of output devices 1110 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1110 may be configured to receive one or more signals (e.g., an output signal provided by the processing unit 1102) and provide an output corresponding to the signal.

In some cases, input devices 1106 and output devices 1110 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1102 may be operably coupled to the input devices 1106 and the output devices 1110. The processing unit 1102 may be adapted to exchange signals with the input devices 1106 and the output devices 1110. For example, the processing unit 1102 may receive an input signal from an input device 1106 that corresponds to an input detected by the input device 1106. The processing unit 1102 may interpret the received input signal to determine whether to provide and/or change one or more outputs in response to the input signal. The processing unit 1102 may then send an output signal to one or more of the output devices 1110, to provide and/or change outputs as appropriate.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost,", "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

As used herein, the general term "computing resource" (along with other similar terms and phrases, including, but not limited to, "computing device" and "computing network") may be used to refer to any physical and/or virtual electronic device or machine component, or set of group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and components thereof (e.g., navigation devices, safety devices or controllers, security devices, and the like); corporate or business infrastructure devices or appliances (e.g., private branch exchange devices, voice-over-internet protocol hosts and controllers, end-user terminals, and the like); personal electronic devices and systems and components thereof (e.g., cellular phones, tablet computers, desktop computers, laptop computers, wearable devices, peripheral input devices, implantable devices, medical devices and the like). It may be appreciated that the foregoing examples are not exhaustive.

Although the embodiments have been illustrated and described with respect to one or more implementations, equivalent alterations and modifications will occur or be known to other skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented method for backing up a plurality of pages of a content collaboration platform, the plurality of pages comprising user-generated content created by one or more users of the content collaboration platform, the method comprising:
   in response to a request for a backup of the plurality of pages,
   defining a set of data chunks;
   for each data chunk of the set of data chunks:
      generating a unique identifier for a respective data chunk by processing user-generated content of a respective subset of pages contained within the data chunk;
      storing the respective data chunk to be accessible via the unique identifier; and
      generating a record associating the unique identifier with information about a relationship of data in the data chunk to an application data structure of the content collaboration platform and a backup date and time;
   in response to a request for an updated backup of the plurality of pages, identifying one or more changes to content of the plurality of pages since the backup; and
   for a particular data chunk of the set of data chunks which includes the one or more changes to the content of the plurality of pages since the backup:
      determining that a magnitude of the one or more changes to the content associated with the particular data chunk is below a predetermined threshold;
      in response to determining that the magnitude of the one or more changes to the content associated with the particular data chunk is below the predetermined threshold, generating a record describing changes to content of pages in the particular data chunk since the backup, the record being associated with the updated backup date and time.

2. The method of claim 1, further comprising:
   for each data chunk of the set of data chunks including content of a page that has changed since the backup:
   determining that the magnitude of the change of each data chunk of the set of data chunks that is above the predetermined threshold; and
   in response to determining the magnitude of the change of each data chunk of the set of data chunks that is above the predetermined threshold:
      generating an updated data chunk including the content of the page that has changed since the backup;

generating a unique identifier for the updated data chunk;
storing the updated data chunk to be accessible via the unique identifier; and
generating a record associating the unique identifier with information about a relationship of data in the data chunk to an application data structure of the content collaboration platform and an updated backup date and time.

3. The method of claim 2, further comprising:
in response to a request to restore the plurality of pages, the request comprising a desired date and time from which to restore the plurality of pages:
selecting a plurality of unique identifiers representative of a plurality of data chunks based on a relationship between the desired date and time from which to restore the plurality of pages and the associated backup date and time of the unique identifiers;
retrieving the plurality of data chunks using the selected plurality of unique identifiers;
for each record describing changes to content of pages of a data chunk having an associated backup date and time with a predetermined relationship to the desired date and time from which to restore the plurality of pages, applying the changes described by the record; and
reconstructing the plurality of pages from the plurality of data chunks based on the associated relationship of data in each of the plurality of data chunks and the application data structure of the content collaboration platform.

4. The method of claim 1, further comprising:
in response to a request to restore the plurality of pages, the request comprising a desired date and time from which to restore the plurality of pages:
selecting a plurality of unique identifiers representative of a plurality of data chunks based on a relationship between the desired date and time from which to restore the plurality of pages and the associated backup date and time of the unique identifiers;
retrieving a plurality of data chunks using the selected plurality of unique identifiers; and
reconstructing the plurality of pages from the plurality of data chunks based on the associated relationship of data in each of the plurality of data chunks and the application data structure of the content collaboration platform.

5. The method of claim 1, wherein:
the one or more content attributes comprise a relative measure of binary to non-binary data contained in the user-generated content.

6. The method of claim 1, wherein:
the one or more content attributes comprise how often the user-generated content has been edited in the past.

7. The method of claim 1, wherein:
the one or more content attributes comprise a number of users that have contributed to the user-generated content.

8. The method of claim 1, wherein storing the data chunk to be accessible via the unique identifier comprises storing the data chunk using the unique identifier as a filename.

9. The method of claim 1, wherein at least one data chunk of the set of data chunks includes content from two or more of the plurality of pages.

10. The method of claim 1, wherein each data chunk comprises a predetermined number of pages of the plurality of pages, the predetermined number of pages determined, at least in part, based on the one or more content attributes determined from the user-generated content.

11. A computer-implemented method for backing up a plurality of issues of an issue tracking platform, the plurality of issues comprising user-generated content created by one or more users of the issue tracking platform, the method comprising:
in response to a request for backup of the plurality of issues,
defining a plurality of data chunks; and
for each data chunk of the plurality of data chunks:
generating a unique identifier for the data chunk;
storing the data chunk to be accessible via the unique identifier; and
generating a record associating the unique identifier with information about a relationship of data in the data chunk to an application data structure of the issue tracking system and a backup date and time;
in response to a request for an updated backup of the plurality of pages, identifying one or more changes in content of the plurality of issues since the backup; and
for a particular data chunk of the plurality of data chunks which includes the one or more changes to the content of the plurality of issues since the backup:
determining that a magnitude of the one or more changes to the content associated with the particular data chunk is below a predetermined threshold;
in response to determining that the magnitude of the change to the content associated with the particular data chunk is below the predetermined threshold, generating a record describing changes to content of issues in the particular data chunk since the backup, the record being associated with the updated backup date and time.

12. The method of claim 11, further comprising:
in response to a request to restore the plurality of issues, the request comprising a desired date and time from which to restore the plurality of issues:
selecting a plurality of unique identifiers representative of the plurality of data chunks based on a relationship between the desired date and time from which to restore the set of data objects and the associated backup date and time of the unique identifiers;
retrieving a plurality of data chunks using the selected plurality of unique identifiers; and
reconstructing the plurality of issues from the plurality of data chunks based on the associated relationship of data in each of the plurality of data chunks and the application data structure of the issue tracking platform.

13. The method of claim 11, wherein at least one data chunk of the plurality of data chunks includes content from two or more of the plurality of issues.

14. The method of claim 11, wherein:
the one or more content attributes comprise a number of assignees associated with the respective issues.

15. The method of claim 11, wherein:
the one or more content attributes comprise a number of comments associated with the respective issues.

16. The method of claim 11, wherein:
the one or more content attributes comprise a status of the respective issues.

17. The method of claim 11, wherein storing the data chunk to be accessible via the unique identifier comprises storing the data chunk using the unique identifier as a filename.

18. The method of claim 11, wherein:
the method further comprises-analyzing at least a subset of the plurality of issues to determine one or more content attributes associated with respective user-generated content of the respective issues; and
each data chunk comprises a predetermined number of issues, the predetermined number of issues being determined, at least in part, based on the one or more content attributes associated with the user-generated content of each of the plurality of issues.

19. A computer-implemented method for backing up a plurality of data objects of a software platform, the method comprising:
in response to a request for a backup of the plurality of data objects:
generating a plurality of data chunks from the plurality of data objects;
for each data chunk of the plurality of data chunks:
generating a unique identifier for the data chunk;
storing the data chunk to be accessible via the unique identifier; and
generating a record associating the unique identifier with information about a relationship of data in the data chunk to an application data structure of the software platform and a backup date and time; and
in response to a request for an updated backup of the plurality of data objects, identifying one or more changes to content of the plurality of data objects since the backup; and
for a particular data chunk of the set of data chunks which includes the one or more changes to the content of the plurality of data objects since the backup:
determining that a magnitude of the one or more changes to the content associated with the particular data chunk of the plurality of data chunks is above the predetermined threshold; and
in response to determining that the magnitude of the one or more changes to the content associated with the particular data chunk is above predetermined threshold:
generating an updated data chunk including the change of the content of the data object since the backup;
generating a unique identifier for the updated data chunk;
storing the updated data chunk to be accessible via the unique identifier; and
generating a record associating the unique identifier with information about a relationship of data in the data chunk to an application data structure of the software platform and an updated backup date and time.

20. The method of claim 19, wherein:
the method further comprises analyzing each data object of the plurality of data objects to determine an estimated stability of content of the data object;
the generating a plurality of data chunks from the plurality of data objects is based on the estimated stability of the content of each of the plurality of data objects, each of the plurality of data chunks including at least a portion of one of the plurality of data objects; and
the estimated stability of the content of the plurality of data objects determines a size of the plurality of data chunks.

* * * * *